United States Patent
Abbott, III et al.

(10) Patent No.: US 10,921,513 B2
(45) Date of Patent: Feb. 16, 2021

(54) METHOD OF SELECTING WIDEBAND MULTIMODE FIBER FROM 850 NM DIFFERENTIAL MODE DELAYS

(71) Applicant: Corning Incorporated, Corning, NY (US)

(72) Inventors: John Steele Abbott, III, Elmira, NY (US); Scott Robertson Bickham, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/682,283

(22) Filed: Nov. 13, 2019

(65) Prior Publication Data

US 2020/0174182 A1    Jun. 4, 2020

Related U.S. Application Data

(60) Provisional application No. 62/773,552, filed on Nov. 30, 2018.

(51) Int. Cl.
*G02B 6/028* (2006.01)
*G01M 11/00* (2006.01)
(Continued)

(52) U.S. Cl.
CPC ......... *G02B 6/0288* (2013.01); *G01M 11/332* (2013.01); *G01M 11/335* (2013.01);
(Continued)

(58) Field of Classification Search
CPC . G02B 6/0288; G01M 11/332; G01M 11/335; G01M 11/338; H04B 10/0775; H04B 10/079
See application file for complete search history.

(56) References Cited

U.S. PATENT DOCUMENTS 6,400,450 B1   6/2002 Golowich et al.
8,351,027 B2   1/2013 Pimpinella et al.
(Continued)

OTHER PUBLICATIONS

IEC 60793-1-49: "Optical Fibres, Part 1: Measurement Methods and Test Procedures"; Section 49: Differential Mode Delay; 82 pages; 2018.
(Continued)

*Primary Examiner* — Michael P Mooney
(74) *Attorney, Agent, or Firm* — Amy T. Lang; John P. McGroarty

(57) ABSTRACT

A method is described for selecting fibers meeting requirements of a second minimum bandwidth at a second wavelength based on differential mode delay data measured at a first wavelength different from the second wavelength. The method comprises measuring the differential mode delay (DMD) data for the multimode fiber at the first wavelength, wherein the DMD data comprises output laser pulse data as a function of the radial position of an input laser pulse having the first wavelength; selecting the multimode fiber based on meeting requirements of the second minimum bandwidth at the second wavelength based on a second set of criteria, comprising a second criterion comprising: the radial dependence of the differential mode delay data measured at the first wavelength being within a pre-determined tolerance of a pre-determined reference function constructed by concatenating two or more even-order polynomials having the form:

$$\tau(r)_{ref,k} = c_{0,k} + c_{1,k}\left(\frac{r}{a}\right)^2 + c_{2,k}\left(\frac{r}{a}\right)^4.$$

25 Claims, 8 Drawing Sheets

(51) Int. Cl.
    *H04B 10/077* (2013.01)
    *H04B 10/079* (2013.01)
(52) U.S. Cl.
    CPC ......... *G01M 11/338* (2013.01); *H04B 10/079* (2013.01); *H04B 10/0775* (2013.01)

(56) References Cited

U.S. PATENT DOCUMENTS

| | | |
|---|---|---|
| 8,483,534 B2 | 7/2013 | Tudury et al. |
| 8,488,115 B2 | 7/2013 | Pimpinella et al. |
| 8,837,890 B2 | 9/2014 | Bickham et al. |
| 10,337,956 B2 | 7/2019 | Molin et al. |
| 10,382,124 B2 | 8/2019 | Molin et al. |
| 2010/0315620 A1 | 12/2010 | Pimpinella et al. |
| 2014/0368809 A1 | 12/2014 | Chen et al. |
| 2015/0205039 A1* | 7/2015 | Molin ................ G02B 6/02047 385/124 |
| 2019/0383999 A1* | 12/2019 | Abbott, III ............ H04L 47/528 |

OTHER PUBLICATIONS

Petermann; "Simple Relationship Between Differential Mode Delay in Optical Fibres and the Deviation From Optimum Profile"; Elec. Lett. vol. 14, pp. 793-794 (1978.
Press et al; "Numerical Recipes, The Art of Scientific Computing"; Cambridge University, pp. 52-59 (1986.
International Search Report and Written Opinion of The European International Searching Authority; PCT/US2019/061425; dated Feb. 27, 2020; 10 pgs.

* cited by examiner

METHOD OF SELECTING WIDEBAND MULTIMODE FIBER FROM 850 NM DIFFERENTIAL MODE DELAYS

This application claims the benefit of priority to U.S. Provisional Application Ser. No. 62/773,552 filed on Nov. 30, 2018, the content of which is relied upon and incorporated herein by reference in its entirety.

FIELD

This description pertains to a method of selecting optical fiber that meets certain performance criteria at a second wavelength based on measurements performed at a first wavelength different from the second wavelength.

BACKGROUND

Multimode optical fiber used with short-wavelength VCSELs (vertical cavity surface emitting lasers) has emerged as a dominant technology for short-reach high data networks. Examples of such networks include office buildings and data centers. Copper networks are increasingly unable to meet the requirements of such networks. Single mode optical fiber can achieve much greater data rates and transmission lengths than multimode optical fiber. But, a network using multimode fiber coupled with VCSELs is less expensive than a network using single mode optical fiber coupled with the types of lasers, splices and connectors required by single mode optical fiber and the small core diameter of single mode fiber. The higher data rates and transmission lengths achievable with single mode fiber are not required for short-reach high data networks. So, multimode fiber provides an effective low-cost optical connectivity solution for such networks.

Multimode fiber operated at 850 nm is presently a leading optical media used in short-reach high data networks. Such fiber typically meets an industry-standard set of requirements referred to as "OM4," which imposes minimum bandwidth requirements at 850 nm. But, recent trends are driving multimode fiber to longer wavelengths. So, the recently ratified OM5 industry-standard requirements impose minimum bandwidth requirements at 953 nm. Due to desires for compatibility with legacy 850 nm systems and wavelength division multiplexing capability, OM5 fiber must also meet the OM4 requirements. So, the OM5 standard includes all of the requirements of the OM4 standard, plus additional minimum bandwidth requirements at 953 nm.

The manufacturing process for optical fiber inevitably leads to variations from fiber to fiber that affects fiber performance. For example, a process designed to produce OM4 fiber may result in a high yield of fiber that actually meets the OM4 requirements, but there may be some fibers that do not. So, before being sold, each fiber is typically measured and verified to meet the OM4 specifications prior to shipment. For example, a bandwidth measurement at 850 nm may determine that a fiber does not meet the OM4 requirements, but does meet the OM3 requirements. If the measured 850 nm bandwidth verifies that a fiber meets the OM4 requirements, a second bandwidth measurement at 953 nm may be performed to determine if this fiber also meets the OM5 requirements. There are other types of industry-standard requirements, such as OM1, OM2 and OM3. In addition, customers sometimes ask for fiber that meets non-standard requirements, for example a minimum bandwidth requirement at a wavelength not specified in the industry standards, or a minimum bandwidth requirement higher than those required by industry standards.

Table 1 shows the industry standard requirements for OM1, OM2, OM3, OM4 and OM5 fibers as of June, 2018. OM1 and OM2 are now in an informative annex for IEC11801 as grandfathered specifications.

TABLE 1

Multimode optical fiber nomenclature and bandwidths
Nomenclature reference: ISO/IEC 11801 and ANSI/TIA-568-C.3

| | | | Minimum Modal Bandwidth (MHz-km) | | | | |
| | | | Overfilled Launch Bandwidth (OFL BW) | | | Effective Bandwidth (Laser Launch) (EMB) | |
| Fiber Type | Core Diameter (μm) | Year Introduced | 850 nm | 1300 nm | 953 nm | 850 nm | 953 nm |
|---|---|---|---|---|---|---|---|
| OM1 | 62.5 | 1986-89 | 200 | 500 | n/a | n/a | n/a |
| OM2 | 50 | 1981 | 500 | 500 | n/a | n/a | n/a |
| OM3 | 50 | 2002 | 1500 | 500 | n/a | 2000 | n/a |
| OM4 | 50 | 2009 | 3500 | 500 | n/a | 4700 | n/a |
| OM5 | 50 | 2016 | 3500 | 500 | 1850 | 4700 | 2470 |

Multimode fiber is verified to meet the OM4 standard requirement of 4700 Mhz-km for a 850 nm laser source by performing an industry standard measurement referred to as a Differential Mode Delay, or "DMD" measurement, on the fiber using an 850 nm laser. Industry standards allow this measurement to be used in two different ways. First, the results of the DMD measurement, which provide data for various radial positions of an input laser pulse, may be compared to a mask. If the DMD measurement meets the requirements of the mask, the fiber qualifies as meeting the 4700 MHz-km requirement. Second, the results of the DMD measurement may be used to calculate an effective minimum bandwidth (calculated), or "minEMBc." If the minEMBc is above a threshold value the fiber is verified to meet the OM4 requirement, which is (4700 MHz-km/1.13)=4160 MHz-km at 850 nm. The ISO/IEC 11801 and ANSI/TIA-568-C.3 standards define a fiber as meeting the requirements for an OM4 or OM5 fiber if minEMBc is greater than or equal to the Minimum Modal Bandwidth numbers in Table 1 divided by 1.13, as opposed to a direct comparison to the bandwidth numbers in Table 1. Similarly, minEMBc times 1.13 may be compared to the values in Table 1 for purposes of verifying OM4 and OM5 fiber. Unless otherwise specified, this document uses the same convention. The DMD measurement at 850 nm may also be used to qualify the fiber as meeting the OM4 standard requirement of 3500 MHz-km for an overfilled launch, or OFL, using a different set of calculations. For OM5 fiber the same specifications at 850 nm are required, as well as a DMD measurement and minEMBc at a wavelength of 953 nm.

Some fiber manufacturers have an installed base of equipment tailored to performing this DMD measurement at 850 nm. In addition, a fiber manufacturer may have a database of DMD measurements measured at 850 nm for OM4 fiber in inventory. An additional DMD measurement may be performed at a second wavelength, such as the 953 nm of the OM5 standard, or at other customer-specified wavelengths. However, given that the fibers meeting this second criterion are a small subset of the manufacturing distribution, it is not cost-effective to perform the second measurement on every single fiber. Accordingly, there is a need for a method to select multimode fibers likely to meet bandwidth requirements at 953 nm or other wavelengths based on DMD measurements performed at 850 nm. More generally, there is a need for a method to select fiber likely to meet bandwidth requirements at a second wavelength based on DMD measurements performed at a first wavelength different from the second wavelength.

SUMMARY

In a 1st aspect, a method is provided for selecting fibers meeting requirements of a second minimum bandwidth at a second wavelength based on differential mode delay data measured at a first wavelength different from the second wavelength. The method comprises:

measuring the differential mode delay (DMD) data for the multimode fiber at the first wavelength, wherein the DMD data comprises output laser pulse data as a function of the radial position of an input laser pulse having the first wavelength;

selecting the multimode fiber based on meeting requirements of the second minimum bandwidth at the second wavelength based on a second set of criteria, comprising a second criterion comprising:

the radial dependence of the differential mode delay data measured at the first wavelength being within a pre-determined tolerance of a pre-determined reference function constructed by concatenating two or more even-order polynomials having the form:

$$\tau(r)_{ref,k} = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \leq r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={1 ... K} where K is 2 or 3.

In a 2nd aspect, for the method of the 1st aspect, the radial dependence of the differential mode delay data measured at the first wavelength is determined using a centroid of the data measured for each value of r.

In a 3rd aspect, for the method of the 1st aspect, the radial dependence of the differential mode delay data measured at the first wavelength is determined using a peak of the data for measured for each value of r.

In a 4th aspect, for the method of the 1st aspect, the radial dependence of the differential mode delay data measured at the first wavelength is determined by:

deconvolving the DMD data measured at the first wavelength to determine mode group delay data $\tau_g$;

reconvolving the mode group delay data $\tau_g$ with a theoretical P×g matrix to determine smoothed differential mode delay data in radial space;

determining the radial dependence of the differential mode delay data measured at the first wavelength using a centroid of the data measured for each value of r.

In a 5th aspect, for the method of any of the 1st through 4th aspects, for k=1:
$r_{1,1}$=0 microns and $r_{2,1}$=7+ microns;
for a radial range defined by $r_{1,1}$ and $r_{2,1}$, the radial dependence of the differential mode delay data measured at the first wavelength is within a pre-determined tolerance of a pre-determined reference function when a least-squares fit of the differential mode delay data to a function having the form:

$$\tau(r)_{ref,k} = c_{0,k} + c_{1,k}\left(\frac{r}{a}\right)^2 + c_{2,k}\left(\frac{r}{a}\right)^4$$

has coefficients:
−0.02 ns/km≤$c_{01}$≤0.2 ns/km;
−1.5 ns/km≤$c_{11}$≤0.5 ns/km; and
−2.0≤ns/km≤$c_{21}$≤8.0 ns/km.

In a 6th aspect, for the method of any of the 1st through 5th aspects:
K=3;
for k=2 and k=3, the pre-determined tolerance $\chi^2$ is:

$$\chi^2 = 10^4 \left[\sum_{k=2}^{K} \sum_{r=r_{1,k}}^{r=r_{2,k}} w_k(\tau(r)_{meas} - \tau(r)_{ref,k})^2\right] / \left[\sum_{k=2}^{K} \sum_{r=r_{1,k}}^{r=r_{2,k}} w_k\right]$$

$\tau(r)_{meas}$ is measured delay at position r;
$\tau(r)_{ref,k}$ is reference delay at position r in interval k:

$$\tau(r)_{ref,k} = c_{0,k} + c_{1,k}\left(\frac{r}{a}\right)^2 + c_{2,k}\left(\frac{r}{a}\right)^4$$

r is radial position in microns;
$w_k$ is a weighting for each of the k regions (k=2 ... K), where $w_2$=$w_3$=1.
a is 25 microns;
$r_{1,2}$=7 microns;
$r_{2,2}$=15 microns;
$r_{1,3}$=15 microns;
$r_{2,3}$=25+ microns;
for k=2:
  $c_{0,2}$=−0.02 to 0.02 ns/km;
  $c_{1,2}$=−0.2 to 0.01 ns/km;
  $c_{2,2}$=−0.6 to 0.01 ns/km;
for k=3:
  $c_{0,3}$=0.01 to 0.1 ns/km;
  $c_{1,3}$=−0.35 to −0.1 ns/km;
  $c_{2,3}$=0.05 to 0.25 ns/km.

In a 7th aspect, for the method of the 6th aspect, wherein:
for k=2:
  $c_{0,2}$=0.0009 ns/km;
  $c_{1,2}$=0.0011 ns/km;
  $c_{2,2}$=−0.206 ns/km;
for k=3:
  $c_{0,3}$=0.0391 ns/km;
  $c_{1,3}$=−0.233 ns/km;
  $c_{2,3}$=0.146 ns/km.

In a 8th aspect, for the method of any of the 1st through 5th aspects:
K=3;
for k=2 and k=3, the pre-determined tolerance $\chi^2$ is:

$$\chi^2 = 10^4 \left[\sum_{k=2}^{K} \sum_{r=r_{1,k}\ step\ 2}^{r=r_{2,k}} w_k(\tau(r)_{meas} - \tau(r)_{ref,k})^2\right] / \left[\sum_{k=2}^{K} \sum_{r=r_{1,k}\ step\ 2}^{r=r_{2,k}} w_k\right]$$

$\tau(r)_{meas}$ is measured delay at position r;
$\tau(r)_{ref,k}$ is reference delay at position r in interval k:

$$\tau_{ref,k} = c_{0,k} + c_{1,k}\left(\frac{r}{a}\right)^2 + c_{2,k}\left(\frac{r}{a}\right)^4$$

r is radial position in microns;
K=3;
$w_k$ is a weighting for each of the k regions (k=2 ... K), where $w_2=w_3=1$.
a is 25 microns;
$r_{1,2}$=7 microns;
$r_{2,2}$=15 microns;
$r_{1,3}$=15 microns;
$r_{2,3}$=25+ microns;
for k=2:
$c_{0,2}$=−0.02 to 0.02 ns/km;
$c_{1,2}$=−0.2 to 0.01 ns/km;
$c_{2,2}$=−0.6 to 0.01 ns/km;
for k=3;
$c_{0,3}$=0.01 to 0.1 ns/km;
$c_{1,3}$=−0.35 to −0.1 ns/km;
$c_{2,3}$=0.05 to 0.25 ns/km.

In a 9th aspect, for the method of the 8th aspect:
for k=2:
$c_{0,2}$=0.0009 ns/km;
$c_{1,2}$=0.0011 ns/km;
$c_{2,2}$=−0.206 ns/km;
for k=3;
$c_{0,3}$=0.0391 ns/km;
$c_{1,3}$=−0.233 ns/km;
$c_{2,3}$=0.146 ns/km.

In a 10th aspect, for the method of any of the 6th through 9th aspects, the second set of criteria requires that $\chi^2<3$ (ns/km)$^2$.

In an 11th aspect, for the method of the 10th aspect, the second set of criteria requires that $\chi^2<2.5$ (ns/km)$^2$.

In a 12th aspect, for the method of the 11th aspect, the second set of criteria requires that $\chi^2<2$ (ns/km)$^2$.

In a 13th aspect, for the method of any of the 1st through 12th aspects, the method further comprises:
selecting the multimode fiber based on meeting requirements of the first minimum bandwidth at the first wavelength based on a first set of criteria comprising:
a first criterion using as input the measured differential mode delay (DMD) data for the multimode fiber measured at the first wavelength.

In a 14th aspect, for the method of the 13th aspect, the method further comprises calculating an effective minimum bandwidth at the first wavelength (minEMBc$_1$) from the DMD data measured at the first wavelength, and wherein the first criterion requires that minEMBc$_1$ is greater than or equal to a first threshold value.

In a 15th aspect, for the method of any of the 13th through 14th aspects, the method further comprises applying a first mask to the DMD data measured at the first wavelength, and wherein the first criterion requires that the DMD data measured at the first wavelength passes the first mask.

In a 16th aspect, for the method of any of the 1st through 15th aspects, the first wavelength is less than the second wavelength.

In a 17th aspect, for the method of any of the 1st through 16th aspects, the first wavelength is in the range 847 nm-853 nm.

In a 18th aspect, for the method of the 14th aspect, the first wavelength is in the range 847 nm-853 nm and the first threshold value is 4160 MHz-km.

In a 19th aspect, for the method of any of the 13th through 18th aspects, the method further comprises calculating from the DMD data measured at the first wavelength an overfilled launch bandwidth at the first wavelength (OFLc$_1$), and wherein the first set of criteria further comprise a criterion requiring that OFLc$_1$ is greater than or equal to 3500 MHz-km.

In a 20th aspect, for the method of any of the 1st through 19th aspects, the method further comprises:
measuring differential mode delay (DMD) data for the multimode fiber at the second wavelength, wherein the DMD data comprises output laser pulse data as a function of the radial position of an input laser pulse having the second wavelength selecting the multimode fiber based on meeting requirements of the second minimum bandwidth at the second wavelength based on a third set of criteria in addition to the second set of criteria, the third set of criteria comprising:
a third criterion using as input the measured differential mode delay (DMD) data for the multimode fiber measured at the second wavelength.

In a 21st aspect, for the method of the 20th aspect, the method further comprises calculating an effective minimum bandwidth at the second wavelength (minEMBc$_2$) from the DMD data measured at the second wavelength, and wherein the third criterion comprises a requirement that minEMBc$_2$ is greater than or equal to a second threshold value.

In a 22nd aspect, for the method of any of the 20th through 21st aspects, the method further comprises applying a third mask to the DMD data measured at the second wavelength, and wherein the third criterion comprises a requirement that the DMD data measured at the second wavelength passes the parameters of the third mask.

In a 23rd aspect, for the method of any of the 1st through 22nd aspects, the second wavelength is in the range 950 nm-956 nm.

In a 24th aspect, for the method of the 21st aspect, the second wavelength is in the range 950 nm-956 nm and the second threshold value is 2190 MHz-km.

In a 25th aspect, for the method of any of the 20th through 24th aspects, the method further calculating from the DMD data measured at the second wavelength an overfilled launch bandwidth at the second wavelength (OFLc$_2$), and wherein the third set of criteria further comprise a criterion requiring that OFLc$_2$ is greater than or equal to 1850 MHz-km.

In a 26th aspect, for the method of any of the 20th through 25th aspects, the second set of criterion are satisfied before measuring differential mode delay (DMD) data for the multimode fiber at the second wavelength.

In a 27th aspect, a method is provided for selecting, from a plurality of multimode fibers, a third subset of the multimode fibers meeting requirements of a first minimum bandwidth at a first wavelength and a second minimum bandwidth at a second wavelength greater than the first wavelength. The method comprises:
measuring differential mode delay (DMD) data for the plurality of multimode fibers at the first wavelength, wherein the DMD data comprises output laser pulse data as a function of the radial position of an input laser pulse having the first wavelength;
selecting a first subset of the plurality of multimode fibers based on criteria comprising:
passing a first mask applied directly to the DMD data measured at the first wavelength;
selecting a second subset of the plurality of multimode fibers based on criteria comprising:
the radial dependence of the differential mode delay data measured at the first wavelength being within a pre-determined tolerance of a pre-determined reference function constructed by concatenating two or more even-order polynomials having the form:

$$\tau_{ref,k} = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \leq r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={2 . . . K} where K is 2 or 3;
selecting the third subset of the plurality of multimode fibers by applying further selection criteria;
wherein:
the first subset is a subset of the plurality of multimode fibers;
the second subset is a subset of the first subset;
the third subset is a subset of the second subset.

In a 28th aspect, a system is provided for selecting a multimode fiber meeting requirements of a first minimum bandwidth at a first wavelength and a second minimum bandwidth at a second wavelength greater than the first wavelength. The system comprises:
a measurement device configured to measure differential mode delay (DMD) data for the multimode fiber at the first wavelength, wherein the DMD data comprises output laser pulse data as a function of the radial position of an input laser pulse having the first wavelength;
a first selection device configured to select the multimode fiber if the multimode fiber passes a first mask applied to the DMD data for the multimode fiber at the first wavelength; and
a second selection device configured to select the multimode fiber if the multimode fiber passes a selection criteria comprising:
the radial dependence of the differential mode delay data measured at the first wavelength being within a pre-determined tolerance of a pre-determined reference function constructed by concatenating two or more even-order polynomials having the form:

$$\tau_{ref,k} = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \leq r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={2 . . . K} where K is 2 or 3.

In a 29th aspect, a method is provided for selecting a multimode fiber meeting requirements of a first minimum bandwidth at a first wavelength and a second minimum bandwidth at a second wavelength different from the first wavelength. The method comprises:
selecting the multimode fiber based on meeting requirements of the first minimum bandwidth at the first wavelength based on a first set of criteria comprising:
a first criterion using as input differential mode delay (DMD) data for the multimode fiber measured at the first wavelength; and
selecting the multimode fiber based on meeting requirements of the second minimum bandwidth at the second wavelength based on a second set of criteria, comprising:
the radial or mode group number dependence of the differential mode delay data measured at the first wavelength being within a pre-determined tolerance of a pre-determined reference function constructed by concatenating two or more even-order polynomials having the form:

$$\tau_{ref,k} = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \leq r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={2 . . . K} where K is 2 or 3.

In a 30th aspect, a method is provided for selecting fibers meeting requirements of a second minimum bandwidth at a second wavelength based on differential mode delay data measured at a first wavelength different from the second wavelength. The method comprises:
measuring the differential mode delay (DMD) data for the multimode fiber at the first wavelength, wherein the DMD data comprises output laser pulse data as a function of the radial position of an input laser pulse having the first wavelength;
selecting the multimode fiber based on meeting requirements of the second minimum bandwidth at the second wavelength based on a second set of criteria, comprising a second criterion comprising:
the radial dependence of the differential mode delay data measured at the first wavelength being within a pre-determined tolerance of a pre-determined reference function having the form:

$$\tau(r)_k = c_{0,k} + c_{1,k}\left(\frac{r}{a}\right)^2 + c_{2,k}\left(\frac{r}{a}\right)^4 + c_{3,k}\left(\frac{r}{a}\right)^6$$

wherein:
a is a normalizing factor;
r is variable radial position on the fiber over at least one range $r_{1,k} \leq r < r_{2,k}$;
$c_{0,k}$, $c_{1,k}$, $c_{2,k}$, and $c_{3,k}$ are coefficients that are constant within each range of r;
$r_{1,k}$ and $r_{2,k}$ are discrete radial positions on the fiber marking the boundary of each range of r;
k is an indexing variable with values k={1 . . . K} where K is 1 or 2.

In a 31$^{st}$ aspect, for the method of the 30$^{th}$ aspect:
K=2;
for k=1:
$r_{1,1}$=0 microns and $r_{2,1}$=7+ microns;
for a radial range defined by $r_{1,1}$ and $r_{2,1}$, the radial dependence of the differential mode delay data measured at the first wavelength is within a pre-determined tolerance of a pre-determined reference function when a least-squares fit of the differential mode delay data to a function having the form:

$$\tau_{ref,k} = c_{0,k} + c_{1,k}\left(\frac{r}{a}\right)^2 + c_{2,k}\left(\frac{r}{a}\right)^4$$

has coefficients:
−0.02 ns/km≤$c_{01}$≤0.2 ns/km;
−1.5 ns/km≤$c_{11}$≤0.5 ns/km;
−2.0≤ns/km≤$c_{21}$≤8.0 ns/km; and
wherein $c_{3,k}$ is set to zero for the fit.
In a 32$^{nd}$ aspect, for the method of any of the 30$^{th}$ through 31$^{st}$ aspects:
K=2;
for k=2, the pre-determined tolerance $\chi^2$ is:

$$\chi^2 = 10^4 \left[\sum_{k=2}^{K}\sum_{r=r_{1,k} \text{ step } 2}^{r=r_{2,k}} w_k(\tau(r)_{meas} - \tau(r)_{ref,k})^2\right] / \left[\sum_{k=2}^{K}\sum_{r=r_{1,k} \text{ step } 2}^{r=r_{2,k}} w_k\right]$$

$\tau(r)_{meas}$ is measured delay at position r;
$\tau(r)_{ref, k}$ is reference delay at position r in interval k;
r is radial position in microns;
$w_k$ is a weighting for each of the k regions (k=2 . . . K), where $w_2$=1.
a is 25 microns;
$r_{1,2}$=7 microns;
$r_{2,2}$ 25+ microns;
for k=2:
  $c_{0,2}$=−0.02 to 0.01 ns/km;
  $c_{1,2}$=−0.3 to 0.1 ns/km;
  $c_{2,2}$=−0.5 to 0.3 ns/km; and
  $c_{2,3}$=−0.1 to 0.4 ns/km.
In a 33$^{rd}$ aspect, for the method of any of the 1$^{st}$ through 22$^{nd}$ aspects, wherein the second wavelength is in the range 950 nm-1070 nm.

The methods of the 30$^{th}$ through 32$^{nd}$ aspects may be combined in any reasonable permutation with the 1$^{st}$ through 29$^{th}$ and 33$^{rd}$ aspects, accounting for differences in the polynomial form.

DETAILED DESCRIPTION

Figure 1:
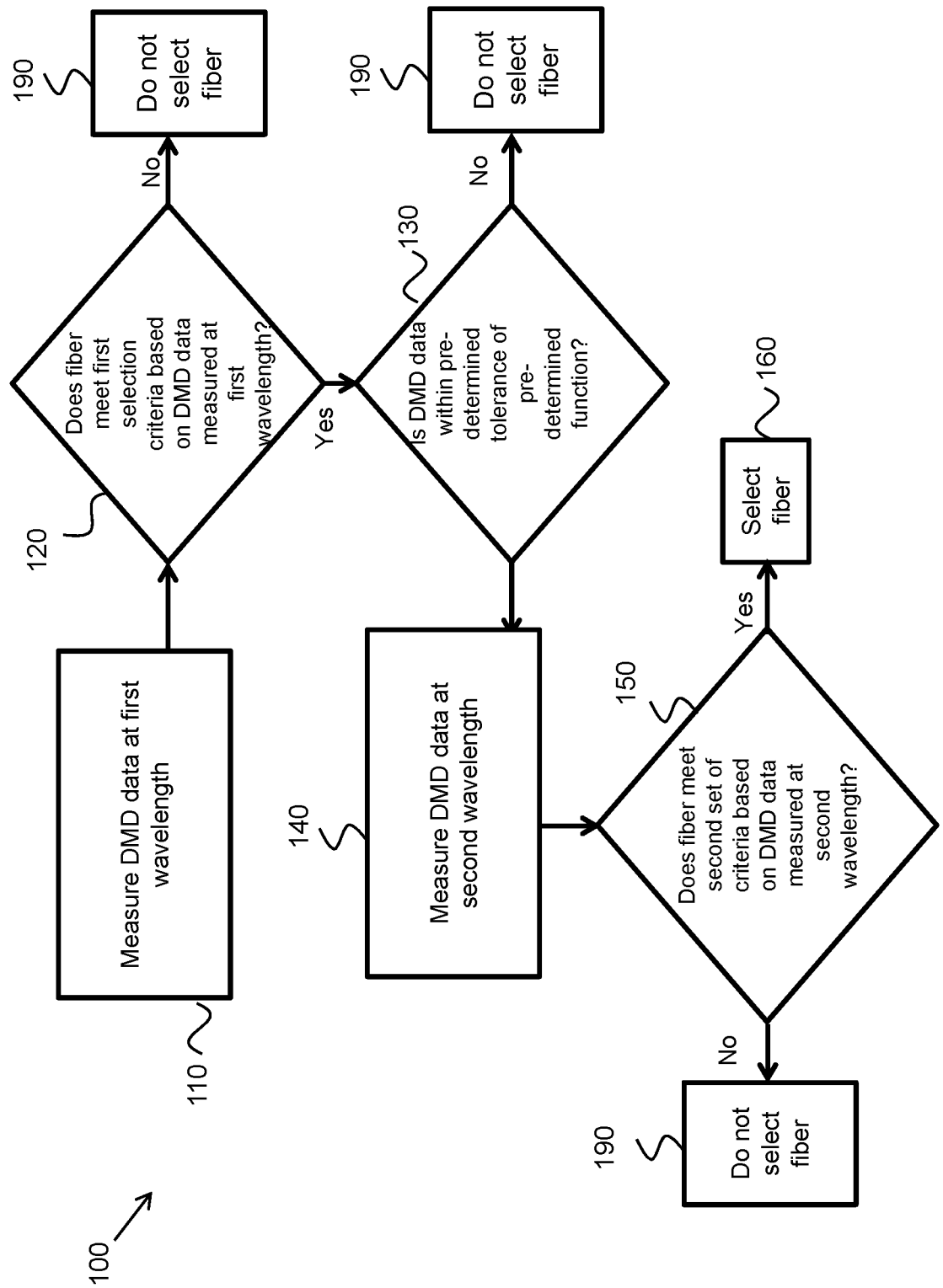
FIG. 1 shows a flowchart for practicing a method.

Fiber Selection for Bandwidth Performance at Multiple Wavelengths

The recently adopted OM5 standards require that multimode fibers meet certain bandwidth requirements at 953 nm, in addition to the bandwidth requirements at 850 nm required by the OM4 standard. In other words, OM5 fiber will also meet OM4 standards. Until new manufacturing techniques are developed, it may be that only a small percentage of OM4 fibers also meet OM5 standards. This is due in part to the fact that many OM4 fibers may have been fabricated using methods and specifications targeted at producing OM4 fiber, without much consideration of meeting OM5 standards.

OM4 fibers are verified to meet the OM4 standards using DMD measurements performed at 850 nm. So, manufacturers of OM4 fibers are well-equipped to perform DMD measurements at 850 nm, and may have a database of such DMD measurements for OM4 fiber in inventory.

At present, OM5 fibers are qualified based on meeting the OM5 standards using DMD measurements performed at 953 nm. But, fiber manufacturers have not previously needed to perform a large volume of DMD measurements at 953 nm, and may not be well-equipped to do so for every fiber produced. It is a challenge to determine when an OM4 fiber may also meet OM5 standards without performing extensive additional measurements at 953 nm, including measurements on many fibers that ultimately will not qualify as meeting OM5 standards.

So, there is a need to use the DMD measurements performed at 850 nm to select OM4 fibers as likely (or not) to meet the OM5 standard. Such a selection process would enable a fiber manufacturer to perform DMD measurements at 953 nm only on OM4 fibers likely to meet the OM5 standard, based on further analysis of the DMD data obtained at 850 nm used to qualify the fiber based on meeting the OM4 standard.

More generally, fiber manufacturers may have a database of DMD measurements at one or more particular wavelengths, and/or the capability to obtain such measurements relatively easily at the one or more particular wavelengths. But, the market or specific customers may demand fibers having specified performance characteristics at other wavelengths. So, there is a need to use DMD measurements performed at a first wavelength to select fibers likely to meet performance characteristics at a second wavelength different from the first, before without actually performing a DMD measurement at the second wavelength. Once a fiber is selected as likely to meet performance characteristics at the second wavelength, a DMD measurement may be performed at the second wavelength to confirm that the fiber meets the required performance characteristic at the second wavelength.

This selection process significantly reduces the number of DMD measurements needed at a second wavelength, such as 953 nm. As a result, there is an increase in the efficiency and speed of identifying fibers meeting performance specifications at the second wavelength, such as the identification of fibers meeting the OM5 bandwidth requirements at 953 nm.

While many of the examples herein are directed to using DMD measurements performed at 850 nm to predict whether a fiber will meet bandwidth requirements at 953 nm, the methods described are more generally applicable, and may be used to predict whether a fiber will meet bandwidth requirements at a second wavelength different from a first wavelength at which DMD measurements are performed. The second wavelength may be less than or greater than the first wavelength. The second wavelength may be in the range between and including 980 and 1064 nm, for example 980 nm, 1000 nm, 1020 nm or 1064 nm.

The first and second wavelengths are often wavelengths of particular interest due to standards-based requirements, specific consumer requirements, or the availability of measuring devices at one or both of the wavelengths.

Bandwidth

A signal traveling down an optical fiber comprises multiple pulses of light. The light is injected into the input end of the fiber, and detected at the output end of the fiber. Signal integrity requires that the pulses are distinguishable from each other and from background noise at the output end of the fiber. The "bandwidth" of a fiber is a measure of how many distinguishable pulses can be sent down a length of fiber per unit time. A higher "bandwidth" means that the pulses can be closer together, such that more information can be transmitted per unit time. Certain phenomena that limit bandwidth, such as attenuation and pulse spreading, often become more pronounced as the distance traveled by the pulse increases. So, a given fiber is capable of higher bandwidths at lower lengths. As a result, the bandwidth of a fiber is often provided in units of frequency times length, specifically MHz-km. For example, an OM4 fiber is required to have a minimum effective modal bandwidth of 4700 MHz-km when the input pulses are from an 850 nm laser.

Some phenomena, such as absorption, cause the light pulses to attenuate as they travel down the fiber. When the signal attenuates to the point that it cannot be reliably distinguished from background noise, the signal loses integrity. Some phenomena, such as modal dispersion, cause light pulses to spread out as they travel down an optical fiber. When this spreading causes the pulses to overlap to the point that adjacent pulses in a signal cannot be distinguished, the signal loses integrity. This loss of integrity, from whatever cause, limits the bandwidth of a fiber. For OM4 and OM5 fiber, modal dispersion is often the phenomenon that limits the performance of a multimode fiber.

Bandwidth and related terms as used herein are defined as follows:

Bandwidth: When a pulse of light is launched into a multimode fiber, it gradually spreads. The pulse spreading of a multimode fiber is quantified by the 'bandwidth', by taking the Fourier Transform H(f) of the input pulse and the output pulse and looking at the ratio of amplitudes |H_out(f)|/|H_in (f)|. The 'bandwidth' is defined as the frequency f where this ratio first decreases to 0.5. For an output pulse which is Gaussian with a standard deviation of σ ns/km, the bandwidth is approximately 0.19/σ GHz.km.

Modal Bandwidth: The Modal Bandwidth of a multimode fiber is the bandwidth attributed to spreading due to modal dispersion (different delay differences between modes), separate from other effects such as chromatic dispersion. In this case the output pulse depends on the relative power in each mode group and the relative delay between the groups. "Modal bandwidth" depends not only on the mode delays of the fiber but also on their relative power, which depends on launch conditions. For example, an "overfilled launch," where an equal amount of power is launched into each individual mode, may result in a different measured or calculated modal bandwidth than a launch from a specific VCSEL.

Effective Modal Bandwidth (EMB): The EMB of a fiber combines the mode group delays, which is a fiber attribute, and the power in the mode groups, which is an attribute of specific launch condition (for example a VCSEL laser).

The terms "bandwidth" and "modal bandwidth" are generic, and can refer to bandwidths using different launch conditions. The term "effective modal bandwidth" relies on defining launch conditions. A person of skill in the art can often tell from the context what the terms mean. For example, a discussion of bandwidth in the context of a standard refers to bandwidth as defined by the standard. As used herein, unless otherwise specified or clear from context, the terms "bandwidth," "modal bandwidth" and "effective modal bandwidth" refer to minEMBc as standardized by ISO/IEC 11801 and ANSI/TIA-568-C.3.

The term EMBc (calculated EMB) refers to constructing an output pulse using a weighted sum of DMD pulses. A single DMD for a fiber can be used to simulate the effect of different lasers by using different weighting functions. The term minEMBc refers to the minimum EMBc of a set of 10 EMBc's generated with 10 different weighting functions, standardized by TIA and IEC. For OM3, OM4, and OM5 fibers the minEMBc calculated from the DMD measurement must meet a certain specification.

Mode Groups and Modal Dispersion

In the field of optical fiber, a "mode" is an electric field distribution that is self-consistent during propagation down an optical fiber. The number of modes that a particular fiber supports depends on the core diameter and numerical aperture of the fiber and the wavelength of light. Smaller core diameters and smaller numerical apertures support fewer modes. A single mode fiber has only one guided propagation mode when used with the intended transmission wavelength, and as such does not suffer from modal dispersion. A multimode fiber has a finite number of guided propagation modes. A "mode group" is a group of modes that have the same "effective index" even though they may travel through different parts of the fiber core. These modes couple strongly to each other and travel at approximately the same speeds in the fiber. For example, the first mode group is comprised of the LP01 mode, which has two polarization components and is considered a mode group for purposes of this disclosure. The second mode group is comprised of two spatially degenerate LP11 modes, each with two polarization components. The third mode group is comprised of the LP02 mode and the two spatially degenerate LP21 modes, each having two polarization components. A multimode fiber with a core diameter of 50 microns and an NA of 0.2 typically supports 18 mode groups at 850 nm.

Different mode groups may travel at different speeds in an optical fiber. As a result, the signal from an input pulse of light that excites multiple modes spreads out as the signal travels along the fiber, because the different modes travel at different speeds. This spreading is called "modal dispersion." Modal dispersion occurs even for monochromatic signals, i.e., single wavelength signals. For a multimode optical fiber used with typical light sources, modal dispersion is often the primary factor that limits the bandwidth of the fiber.

Modal dispersion is dependent on wavelength. So, the same fiber may have different modal dispersion behavior at different wavelengths.

DMD Measurements

It is difficult to directly measure the propagation speed of a single mode group in a multimode fiber, because most input signals excite multiple mode groups. So, the result of any given input signal results in data that contains a mix of information about various mode groups. DMD or "Differential Modal Dispersion" measurements are often performed to obtain this type of data. A DMD measurement is performed by focusing a pulsed laser at a specific location on the core of an optical fiber being tested. A high-speed detector and sampling oscilloscope receive the laser pulses exiting the fiber. The output pulse amplitude as a function of time is recorded. Then, the laser spot is stepped across the fiber core radius. At each position, similar amplitude and time data are recorded. The data is then used to determine a relative delay for each of the radial pulses. "Relative delay" for a DMD measurement is relative to a reference delay, for example the delay measured when the radial offset of the laser is 7 microns from the centerline of the fiber. Unless otherwise specified, relative delay was calculated relative to the delay measured when the radial offset of the laser is 7 microns from the centerline of the fiber.

Figure 5:
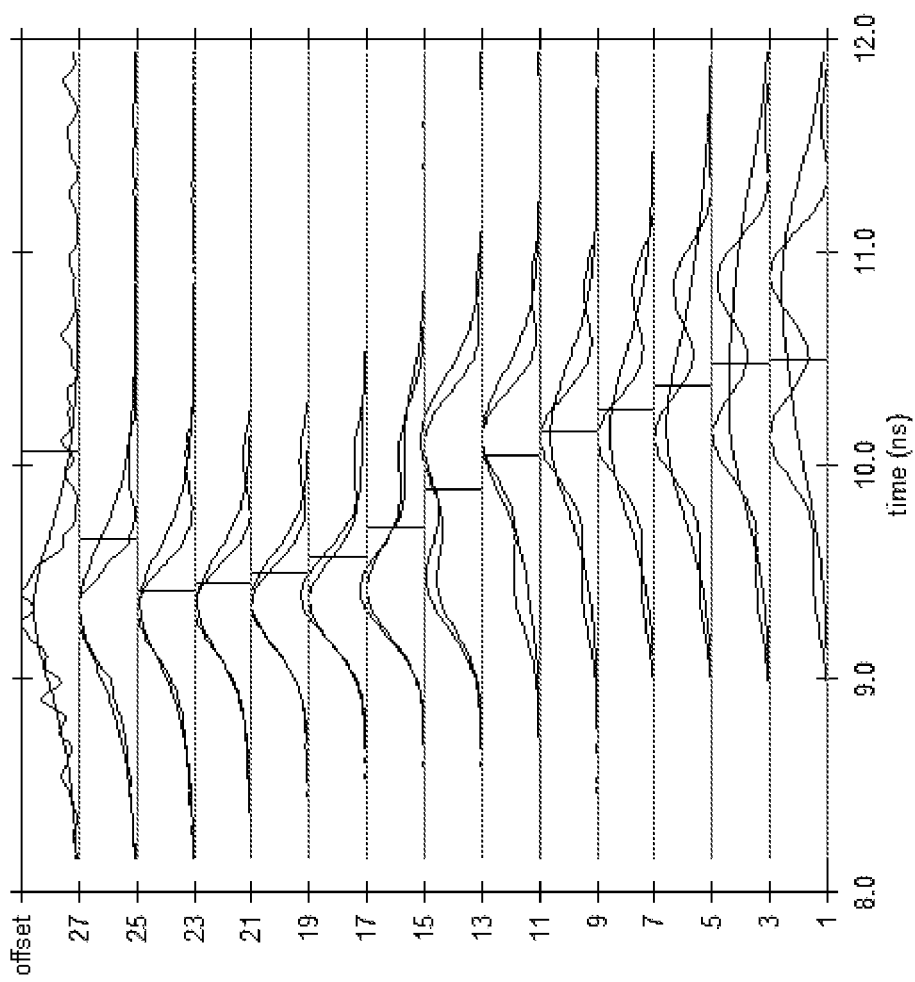
FIG. 5 shows delay vs. radial offset obtained a DMD measurement for a first multimode optical fiber.

As can be seen with reference to FIG. 5, DMD data is in the form of a pulse having various amplitudes at different points in time. For some of the calculations described herein, it is useful to characterize such a pulse as being at a single point in time. One way to do so is to use a peak amplitude of the measured data as the single "delay" for a given value of r. One attraction of peak delay is that it is computationally simple. Another way to do so is to use a centroid of the pulse as the single "delay" for a given value of r. The vertical lines in FIG. 5 represent such centroids. Centroid values may be obtained by performing a radially weighted average of the peak position at each radial offset:

$$<\tau_r> = \frac{\int \tau I(\tau) d\tau}{\int I(\tau) d\tau}$$

where $<\tau_r>$ is the centroid delay at offset r (for example, the vertical bars in FIG. 5), $\tau$ is time (for example, the x-axis in FIG. 5), and $I(\tau)$ is the pulse amplitude at position $\tau$ (for example, the amplitude of the curves in FIG. 5). Unless otherwise specified, the centroid value was used in the examples herein. One attraction of 'centroid' delay is that it is often a smooth function of the DMD offset position.

Figure 6:
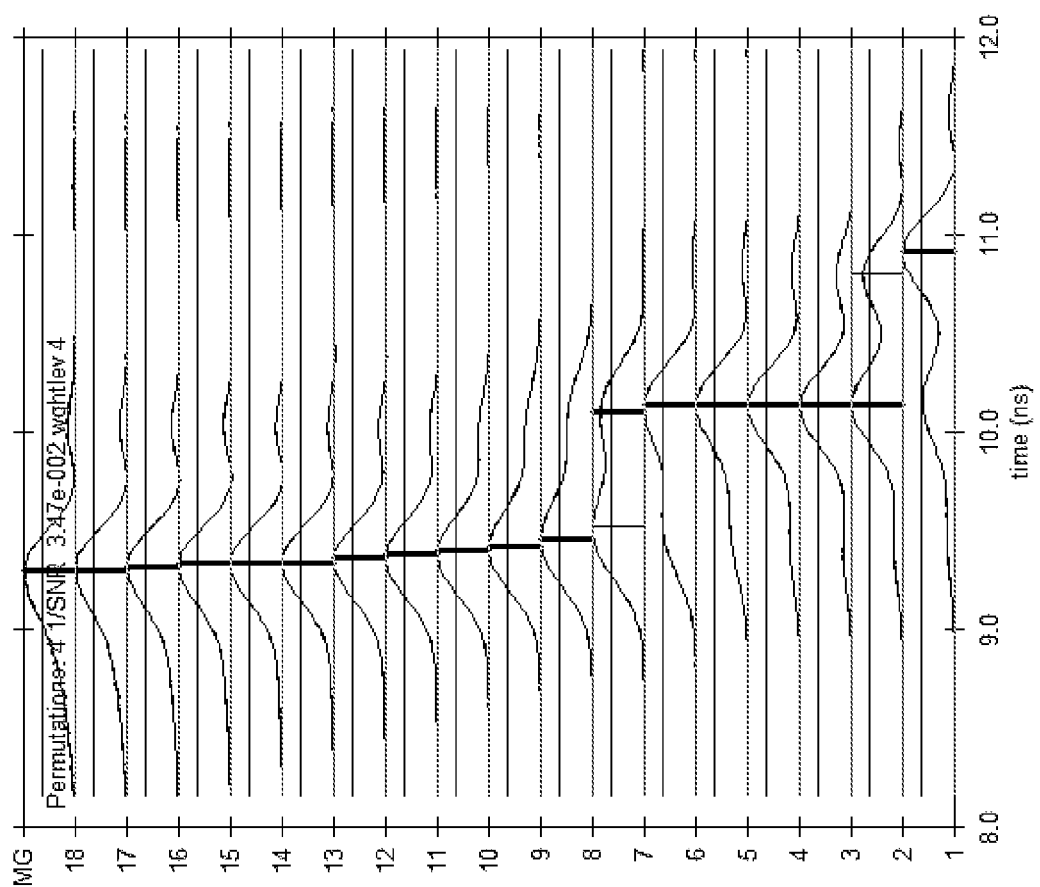
FIG. 6 shows delay vs. mode group for the first multimode optical fiber.

Yet another way to characterize a delay pulse as being a single point is to deconvolve the mode group data in radial space to determine mode group delay data, such as that illustrated in FIG. 6. This mode group delay data may then be reconvolved back into radial space. The advantage of doing these transformations is that they generate a smoothly varying centroid in radial space, which may then be used as the single delay for a given value of r. This technique using the transforms takes out the effects of chromatic dispersion broadening and differential attenuation and may in some cases give a clearer indication of performance. Each method of determining a single delay for a given value of r has advantages and disadvantages. Other methods may also be used.

Unless otherwise specified, the DMD measurements described herein are performed according to IEC 60793-1-49.

A DMD measurement provides information about the relative delay of light propagating through a multimode optical fiber as a function of the radial position of an input pulse of light.

Radial Space and Mode Group Space

For purposes of this application, a "space" is a mathematical concept related to a coordinate system. In "radial space," data is provided as a function of the radial position of an input signal—there is a data point, data set or curve for each radial position of the input laser pulse. Radial position may be thought of as an axis, such as the x-axis, of the radial space coordinate system. In "mode group space," data is provided as a function of mode group—there is a data point, data set or curve for each mode group. Mode group may be thought of as an axis of the mode group space coordinate system.

DMD data is recorded in "radial space," because data is measured for various positions of a laser pulse relative to the centerline of the fiber. DMD data includes information about mode group delay. But, it is difficult to directly see this information because the mode group delay information is mixed into various radial positions. At each input radial position, the input laser pulse excites multiple modes. And, each mode is excited by multiple laser positions. For positions close to the center of the core, lower order modes are preferentially excited. For positions close to the edge of the core, higher order modes are preferentially excited. As such, the relative delay of each laser pulse in a DMD measurement is caused by a combination of various mode group delays. But, DMD data does not directly provide information about the relative delay of each mode group. DMD data in radial space is at a particular wavelength, the wavelength at which that data was measured.

FIG. 5 shows an example of DMD data in radial space. The use of an offset or radial position on the Y-axis indicates that the data is in radial space.

Transformation to Mode Group Space

For example, the DMD measurement can be represented in radial space by a matrix $F_{xt}$, where x is the offset and $F_{xt}$ is the discretized matrix of the measured DMD pulse data $F_x(t)$ at offset x. $F_{xt}$ is a matrix with a row for each radial offset and a column for each discrete point in time measured. The same data can be represented in mode group space by a matrix $h_{gt}$, where g is mode group, and $h_{gt}$ is the discretized matrix of the data $h_g(t)$ for mode group g. $h_{gt}$ is a matrix with a row for each mode group and a column for each discrete point in time measured.

A "transformation" is a way to map data from one space into another space. The relative delay of each mode group $h_{gt}$ may be obtained from $F_{xt}$ by a transformation from radial space to mode group space. Similarly, $F_{xt}$ may be obtained from $h_{gt}$ by a transformation from mode group space to radial space. For example, data in a $h_{gt}$ matrix can be transformed from mode group space to radial space (data in a $F_{xt}$ matrix) by combining "g" mode group delay functions, $h_g(t)$ with a weighting given by a $P_{xg}$ matrix:

$$F_{xt} = \Sigma_g P_{xg} h_{gt} \qquad (1)$$

For example, the $P_{xg}$ matrix is the same as the $P_{rg}$ matrix described in IEC-60793-1-49 section C2, but with different notation. It is a matrix that defines the relative power in mode group 'g' for DMD offset 'x'. It can be calculated numerically using overlap integrals between the input beam from the launch fiber and the fiber modes.

When DMD data is measured, in the equation above, the matrix $F_{xt}$ of measured data and the theoretical $P_{xg}$ matrix are known. The matrix $h_{gt}$ can be estimated by a transformation from radial space to mode group space, which is an 'inverse transform' of the transformation from mode group space to radial space described in the preceding paragraph.

One issue encountered in the transformation of the DMD data from radial space to mode group space is the "spot-size" effect, which is a result of the excitation of multiple mode groups at a given offset x due to the finite size of the laser excitation spot. One method proposed in U.S. Pat. No. 6,400,450B1 to overcome the spot-size effect is to use an iterative nonlinear least squares approach to estimate the discrete mode group delays. However, this methodology is computer-intensive and impractical for production use.

We have discovered that we can construct a matrix inverse to $P_{xg}$, which we designate as $Q_{gx}$, by using a linearly-constrained least squares approach. A $Q_{gx}$ based on directly inverting $P_{xg}$ may lead to undesirable noise when used to transform data from radial space to mode group space. Mathematically smoothing $P_{xg}$ solves this problem, while still resulting in usable mode group space data. This smoothing is accomplished by minimizing the following equation for each value of time t:

$$\chi_t^2 = \Sigma_x (F_{xt} - \Sigma_g P_{xg} h_{gt})^2 + \lambda_1 \Sigma_{g'}(0_{g't} - \Sigma_g D_{g'g} h_{gt})^2 \quad (2)$$

The first term in Equation 1 satisfies equation 1, and the second term in Equation 2 forces $h_{gt}$ to be a smooth function of g. The coefficient $\lambda_1$ ensures that this smoothness requirement is a small constraint. $\lambda_1$ is determined empirically on a case by case basis—the minimum $\lambda_1$ that results in a smooth solution for $h_{gt}$ should be used. Using a value of $\lambda_1$ that is too large emphasizes smoothness too much, resulting in a loss of information. Using a value of $\lambda_1$ that is too small results in undesirable noise as described above. Each term of the matrix $0_{g't}$, which has mode group for rows and time for columns, has a value of zero. $D_{g'g}$ is a square matrix which has mode groups for columns and rows, and values of –2 on the diagonal (g=g') and 1 on the off-diagonal (g=g'±1). $\chi^2$ is a measure of fitting error, i.e., how well $h_{gt}$ fits the equation above. Equation 2 can be solved by standard least-squares techniques using singular value decomposition, as described in Numerical Recipes: The Art of Scientific Computer (Press et al., Cambridge University Press, 1986). The result is an $h_{gt}$ that is "smooth" relative to an $h_{gt}$ calculated using the original $P_{xg}$ matrix.

Equation (2) is written in its specific form to be equivalent to an augmented linear matrix equation suitable for least squares solution with singular value decomposition:

$$\begin{pmatrix} F_{xt} \\ 0_{gt} \end{pmatrix} = \begin{vmatrix} P_{xg} \\ \lambda_1 D_{gg} \end{vmatrix} (h_{gt})$$

The top 'row' of the augmented vector and augmented matrix is the first term in equation (2), and the bottom 'row' is the second term. The matrix $Q_{gx}$ is the pseudoinverse (least squares inverse) of this augmented matrix.

$Q_{gx}$ is a matrix with mode group g for rows and offset x for columns and is obtained by using standard matrix decomposition techniques, as described in Numerical Recipes: The Art of Scientific Computer (Press et al., Cambridge University Press, 1986). Once obtained, $Q_{gx}$ may be used for multiple fibers.

The inverse matrix $Q_{gx}$ can then be used to generate the function $h_{gt}$ with a simple matrix multiplication:

$$h_{gt} = \sum_x Q_{gx} F_{xt}$$

If there are 18 mode groups (for example) supported by the core of the MMF (multimode fiber), there will be 18 $h_{gt}$ functions, and the mode group delay $\tau_g$ of the $g^{th}$ mode group will be the value of t where $h_{gt}$ exhibits a maximum.

In this transformation from radial space to mode group space, the total output power in the DMD as a function of offset is assumed to be $$P_x^{tot} = \sum_g P_{xg}$$

If this total power $P_x^{tot}$ does not agree with the measured total power $P_x^{meas}$, then the relative attenuations of the mode groups are corrected using a second constrained least squares problem to solve $$P_x^{meas} = \sum_g P_{xg} A_g$$

where Ag are weighting coefficients for each mode group g, and $P_{xg}$ is replaced by $P_{xg} A_g$ before inversion to obtain $Q_{gx}$.

Data in both radial and mode group space depends on wavelength, and changes as wavelength changes. Unless otherwise specified, the wavelength for a data set is the wavelength at which the data was measured, even if the data has been transformed into mode group space. So, the mode group data still retains its association with the first wavelength, even though it is being used to predict bandwidth performance at a second wavelength.

Unless otherwise specified, relative delay in mode group space was calculated relative to the average delays of mode groups 2 through 15.

FIG. 6 shows an example of DMD data in mode group space. The use of mode group (MG) on the Y-axis indicates that the data is in mode group space.

The Use of Even Ordered Polynomials to Predict Fiber Performance at a Second Wavelength Based on DMD Measurements Performed at a First Wavelength Mode delays in a MMF depend on even powers of the normalized radius (Equation 3):

$$\tau(r) = \Sigma c_v \left(\frac{r}{a}\right)^{2v} \quad (3)$$

where r is radius, α is a normalizing factor for radius, ν is an indexing variable, and τ is mode delay at position r. See K. Petermann, "Simple Relationship between Differential Mode Delay in Optical Fibres and the Deviation from Optimum Profile," Elec. Lett. vol. 14, pp. 793-4 (23rd Nov. 1978).

In some aspects, the lower powers of Equation 3 are dominant. Very little useful information is lost by truncating the indexing variable ν at two or three.

Truncating ν at 2

So, for example, when ν is truncated at 2, and the terms for ν=0, 1 and 2 are written out, Equation 3 may be rewritten as Equation 4:

$$\tau(r) = c_0 + c_1 \left(\frac{r}{a}\right)^2 + c_2 \left(\frac{r}{a}\right)^4 \quad (4)$$

When ν is truncated at 2, it has been found that this dependence of τ on even powers of normalized radius may be best modeled by breaking radial position into 3 discrete radial ranges, with different coefficients $c_v$ for each radial range. These ranges may be represented by an indexing variable k, where k=1 . . . K, and where K=2 or 3. In other words, this indexing may be used to concatenate two or three polynomials having the form of equation 3 (or equation 4), but with different coefficients $c_v$ for different radial ranges. With such indexing, Equation 4 may be rewritten as Equation 5:

$$\tau(r)_k = c_{0,k} + c_{1,k} \left(\frac{r}{a}\right)^2 + c_{2,k} \left(\frac{r}{a}\right)^4 \quad (5)$$

Based on observation, it is desirable to use the indexing variable k to divide radial space into three regions, $r_{1,k} \leq r < r_{2,k}$, where $r_{1,k}$ is the lower bound of the region k, and $r_{2,k}$ is the upper bound. Specifically, it is desirable to use the following regions:

k=1: $r_{1,1}$=0 microns; $r_{2,1}$=7 microns;
k=2: $r_{1,2}$=7 microns; $r_{2,2}$=15 microns;
k=3: $r_{1,3}$=15 microns; $r_{2,3}$=25+ microns.

The + notation in 25+ indicates that the point at 25 microns is a part of the radial range for k=3, even though the upper bounds for the ranges are excluded for k=1 and k=2.

Truncating ν at 3

Truncating ν at 3 provides extra flexibility in fitting a polynomial having the form of Equation 3 to reference data. Based on observation, this extra flexibility allows for a good fit where K=2 instead of K=3.

When ν is truncated at 3, and the terms for ν=0, 1, 2 and 3 are written out, Equation 3 may be rewritten as Equation 6:

$$\tau(r) = c_0 + c_1 \left(\frac{r}{a}\right)^2 + c_2 \left(\frac{r}{a}\right)^4 + c_3 \left(\frac{r}{a}\right)^6 \quad (6)$$

When ν is truncated at 3, it has been found that this dependence of τ on even powers of normalized radius may be best modeled by breaking radial position into 2 discrete radial ranges, with different coefficients $c_v$ for each radial range. These ranges may be represented by an indexing variable k, where k=1 . . . K, and where K is 2. In other words, this indexing may be used to concatenate two polynomials having the form of equation 3 (or equation 6), but with different coefficients $c_v$ for different radial ranges. With such indexing, Equation 6 may be rewritten as Equation 7:

$$\tau(r)_k = c_{0,k} + c_{1,k} \left(\frac{r}{a}\right)^2 + c_{2,k} \left(\frac{r}{a}\right)^4 + c_{3,k} \left(\frac{r}{a}\right)^6 \quad (7)$$

Based on observation, it is desirable to use the indexing variable k to divide radial space into three regions, $r_{1,k} \leq r < r_{2,k}$, where $r_{1,k}$ is the lower bound of the region k, and $r_{2,k}$ is the upper bound. Specifically, it is desirable to use the following regions:

k=1: $r_{1,1}$=0 microns; $r_{2,1}$=7 microns;
k=2: $r_{1,2}$=7 microns; $r_{2,2}$=25+ microns.

The + notation in 25+ indicates that the point at 25 microns is a part of the radial range for k=2, even though the upper bounds for the ranges is excluded for k=1.

The dependence of the delays on even-order powers of the radius is apparent from the behavior of many "premium" wideband fibers that were measured. Without being limited by theory, it is believed that different parabolic responses are the result of (1) the LOMs (lower order modes) have negative relative delays that decrease monotonically as a consequence of the slightly lower (~0.02) alpha value of the refractive index profile of the core compared to the value that results in bandwidth peak at 850 nm. It has been observed that the alpha value for high bandwidth at 850 nm is around 2.12, while the optimum alpha value for an OM5 is approximately 2.09 to 2.11, which shifts the bandwidth peak to the 865-880 nm range.

Without being limited by theory, the flattening or slight upward concavity of the third parabolic region in the reference delay curve for radii greater than about 15 microns indicates that the optimum refractive index profile includes a mechanism to partially compensate the alpha errors that would otherwise drive the delays of the HOMs (high order modes) to excessively negative values. The mechanism that is available for slowing down the HOMs is the trench that is necessary to achieve bend-insensitivity. By shifting the trench slightly closer to the core (e.g. from 1.6 microns to 1.5 microns), or by making it deeper (e.g. −0.45% delta versus −0.40%), the electric fields of the higher order modes are compressed, which slows them down and partially compensates the lower alpha value of the graded index core.

The radial range from r=0 to 7 microns, corresponding to k=1 in the examples herein, encompasses a region where the LP01 and LP11 modes propagate. Variations in the relative delays in this radial range are often due to non-uniformity in the centerline region of the optical fiber and are not correlated with the curvature of the differential mode delays when the alpha value is lower or higher than the value that produces the maximum bandwidth at the first wavelength. Analysis of the DMD data for a large number of OM5 fibers indicates that the relative delays in the radial range from r=0 to 7 microns are preferably constrained to values between and including −0.02 and 0.2 ns/km.

Figure 2:
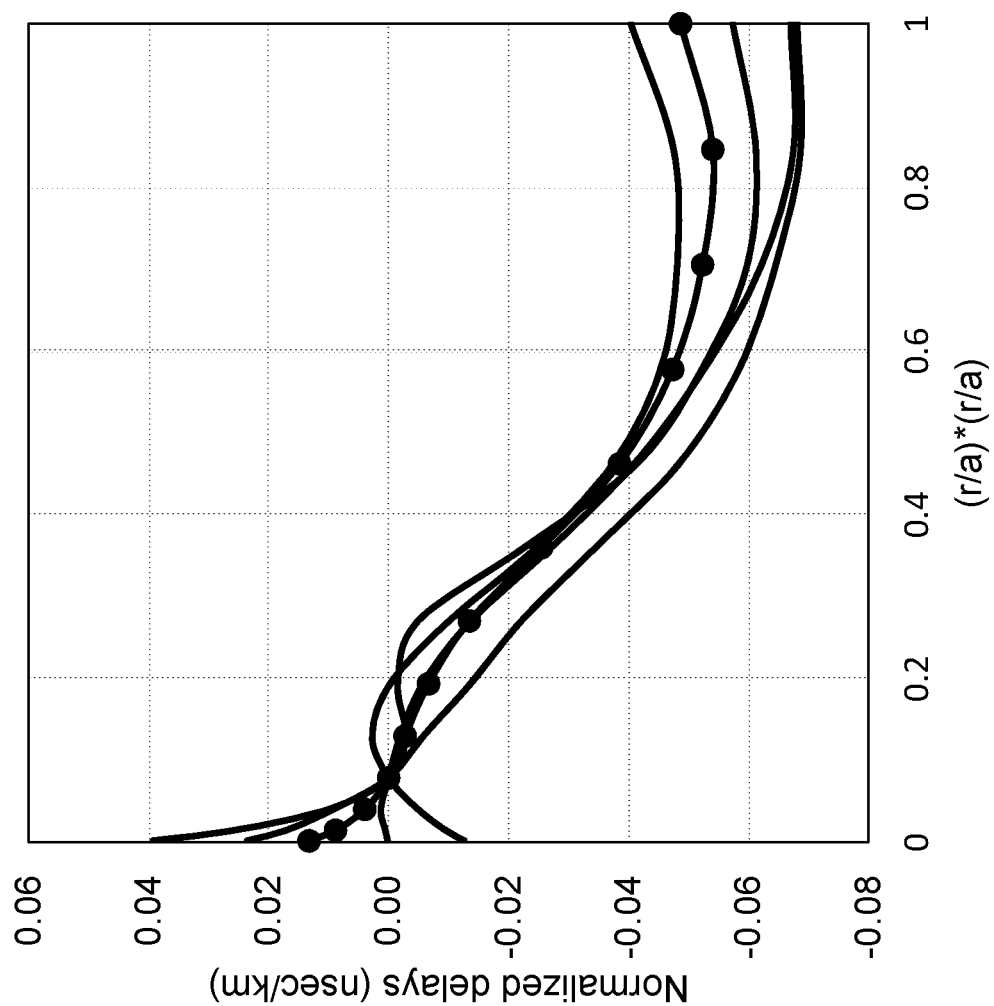
FIG. 2 shows a plot of relative delay v. normalized radius squared, for the average of twelve premium wideband fibers (curve with solid circles), and for four of the fibers used to calculate the average.
Figure 4:
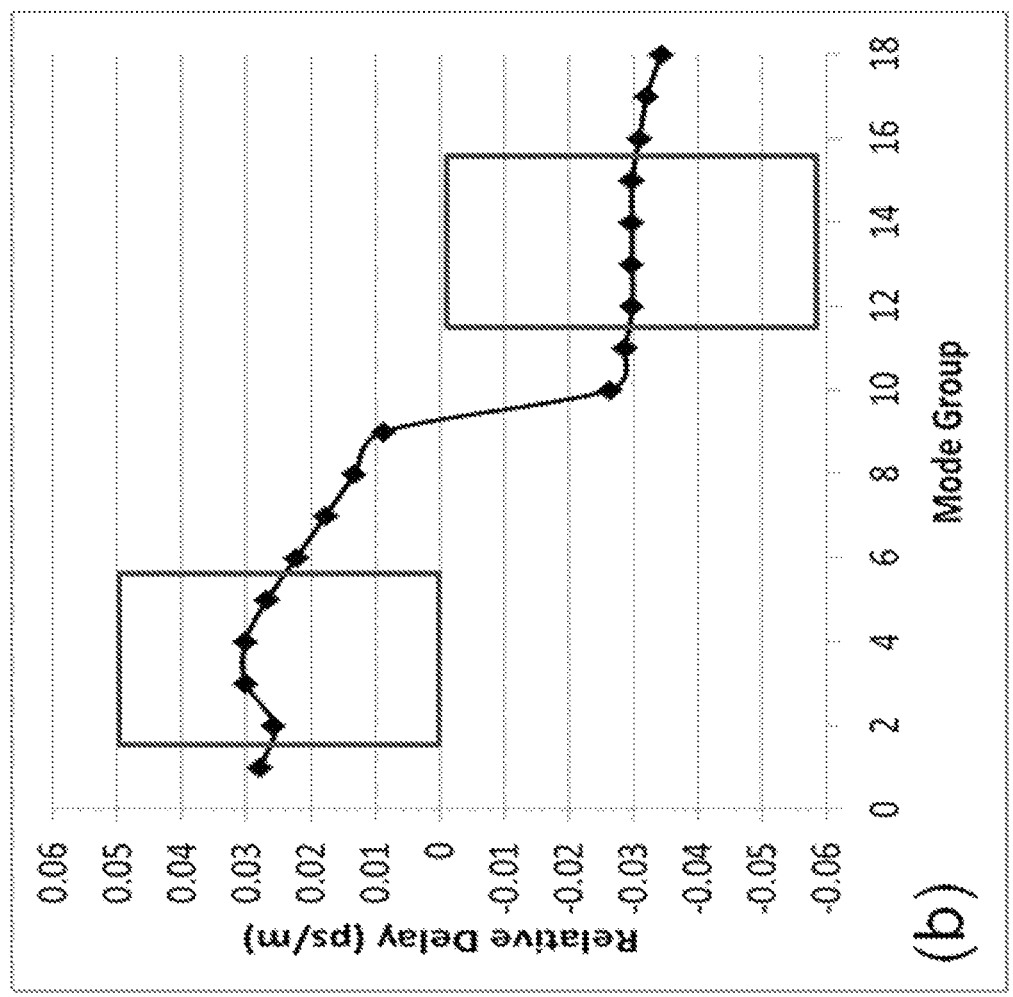
FIG. 4 shows a plot the mode group delays of the premium wideband fiber of Example C.

This dichotomy of the delay regions corresponding to k=1, 2 and 3 is more apparent when the delays are transformed from radial space to mode group space. FIG. 4 shows an example of mode group delay data for an OM5 fiber, specifically for the fiber of Example C. FIG. 4 also shows a mask algorithm that may be used to select potential wideband fibers. The mode group delays that correspond to the radial space delays plotted in plot 210 are plotted in FIG. 4. The delays of the lower order mode groups decrease slowly with increasing mode group number, and the delays of mode groups 2 through 5 are well-centered in the mask—which spans from 0 to 0.06 ps/m. There is a ~−0.04 ps/m step in between mode groups 9 and 10, which matches the transition to the regime of the averaged reference curve of FIG. 2 above 0.4 $(r/a)^2$. The HOM delays are centered in the second 0 to −0.05 ps/m mask that may be used to select wideband fiber candidates. The flatness of the mode group delays in both the LOM and HOM regimes are likely a result of mode coupling, which prevents the mode group delays from decreasing monotonically as one might expect based on the negative alpha error. The addition of the trench in the cladding surrounding the core breaks the symmetry and creates a perturbation on the HOMs that results in their being coupled together and decoupled from the LOMs.

Equations having the form of Equation 3 (for example, Equations 3 through 7) have a fundamental advantage over other approximations that may be used to model fiber behavior, in that Equation 3 is based on the physics underlying fiber behavior. As such, Equation 3 does not lose information to noise caused by modeling fiber behavior in ways that do not match the underlying physics.

In many cases, examples of desirable fiber ("reference fiber") are available, as well as DMD data from such fibers. An equation having the form of Equation 3 may fit to such DMD data to generate a reference curve. Ideally, an average of DMD data from multiple desirable reference fibers is used to generate the reference curve. Then, DMD data from other fibers may be compared to the reference curve. Fibers with DMD data that is a close match to the reference curve are expected to have characteristics similar to the desirable reference fiber. For example, if the reference curve is constructed using DMD data at 850 nm from reference fibers meeting OM5 criteria at 953 nm, other fibers having 850 nm DMD data similar to the reference curve are expected to have a high likelihood of also meeting OM5 criteria.

This high likelihood that the other fibers meet OM5 criteria at 953 nm can be determined without actually measuring DMD data for the other fibers at 953 nm. As such, when trying to determine which of these other fibers meet OM5 criteria, the reference curve may be used to screen the fiber using DMD data measured at 850 nm. Fiber failing the screen is unlikely to meet OM5 criteria, and may be binned accordingly. Fiber passing the screen may have DMD measurements performed at 953 nm to confirm that the fiber meets OM5 standards, where the likelihood of meeting such standards is significantly higher than if the screen had not been performed.

Whether a fiber has measured DMD data "similar" to a reference curve may be determined using any suitable method. One such method is to calculate $\chi^2$ in Equation 8:

$$\chi^2 = 10^4 [\Sigma_{k=1}^{K} \Sigma_{r=r_{1,k}}^{r=r_{2,k}} w_k (\tau(r)_{meas} - \tau(r)_{ref,k})^2] / [\Sigma_{k=1}^{K} \Sigma_{r=r_{1,k}}^{r=r_{2,k}} w_k] \quad (8)$$

where $\chi^2$ is a measure of how close the measured data is to the reference curve. $w_k$ is a weighting factor that may be used to assign different weights to the different concatenated polynomials corresponding to the different radial ranges. $\tau(r)_{meas}$ is the measured DMD data for the fiber being evaluated. $\tau(r)_{ref,k}$ is the reference curve. If $\chi^2$ is below a pre-determined value, then the radial dependence of the differential mode delay data measured at the first wavelength $(\tau(r)_{meas})$ is within a pre-determined tolerance of a pre-determined reference function $(\tau(r)_{ref,k})$ DMD data is measured at discrete radial points. It is preferred to measure from the center of the fiber to the core radius in increments of 1 micron. But, to save time, measurements may be taken in increments of 2 microns, starting at 1 micron from the center. More generally, measurements may be taken at an arbitrary set of points or at arbitrary intervals. Equation 8 is directed to measurements taken every micron. For example, Equation 9 may be used to evaluate DMD data with a 2 micron interval between measured points—Equation 9:

$$\chi^2 = 10^4 [\Sigma_{k=1}^{K} \Sigma_{r=r_{1,k} step\ 2}^{r=r_{2,k}} w_k (\tau(r)_{meas} - \tau(r)_{ref,k})^2] / [\Sigma_{k=1}^{K} \Sigma_{r=r_{1,k} step\ 2}^{r=r_{2,k}} w_k] \quad (9)$$

The "step 2" notation means that r increments in steps of 2, instead of steps of 1 which is the default for sigma notation.

The weighting factor $w_k$ may be used to assign different weights to different radial ranges, when evaluating whether a fiber is similar to the reference fibers(s). For example, a radial range from r=0 to 7 microns, corresponding to k=1 in some of the examples herein, encompasses a region where the LP01 and LP11 mode propagate. The relative delays of these modes are constrained in fibers with high modal bandwidths, but the poor correlation of the modal delays in this region means that it may be desirable to give the k=1 region a low or zero weight when evaluating $\chi^2$ in Equation 9. This can be accomplished, for example, by setting $w_1=0$, and $w_2=w_3=1$.

Selection of Fiber

FIG. 1 shows a flowchart 100 for a method of selecting fiber. In step 110, a fiber is measured to obtain DMD data at a first wavelength. In step 120, the method proceeds to step 130 if the fiber meets a first set of criteria at the first wavelength based on the DMD data measured at the first wavelength. Otherwise, the fiber is not selected (step 190). In step 130, the method proceeds to step 140 if the DMD data meets a second set of criteria based on the DMD data measured at the first wavelength—whether the DMD data is within a pre-determined tolerance of a pre-determined function. The pre-determined function is an even ordered polynomial having the form of Equation 3, e.g., Equations 3 through 7. Otherwise, the fiber is not selected (step 190). In step 140, DMD data is measured at a second wavelength. In step 150, the fiber is selected (step 160) if the fiber meets a second set of criteria based on the DMD data measured at the second wavelength. Otherwise, the fiber is not selected (step 190).

FIG. 1 is an exemplary flowchart only, showing one aspect where evaluating whether DMD data is within a pre-determined tolerance of a pre-determined function (step 130) can be used to assist with fiber selection. Other aspects may be used, where such an evaluation (step 130) is used with the steps of FIG. 1 in different order, less than all the steps in FIG. are used, and/or step 130 of FIG. 1 is combined with steps and measurements other than those shown in FIG. 1. When other aspects are practiced, it is desirable to perform step 130 of FIG. 1 before or instead of steps 140 and 150. This is because step 130 uses DMD data measured at the first wavelength to predicts whether the fiber is likely to meet the second set of criteria based on DMD data measured at the second wavelength. As such, step 130 may be used to reduce measurements of DMD data at the second wavelength, by weeding out only measuring such data only for fibers likely to pass the third set of criteria.

One exemplary aspect is similar to that illustrated in FIG. 1, but with the order of steps 120 and 130 reversed.

One exemplary aspect is similar to that illustrated in FIG. 1, but without step 120. This aspect might be useful, for example, where DMD data is available for a wavelength that is not of interest for fiber performance, but may still be useful for predicting whether the fiber will perform well at other wavelengths.

The first wavelength may be any wavelength at which DMD data can be obtained for multimode optical fiber. For example, the first wavelength may be 850 nm (or 847-853 nm), which is the wavelength at which many fiber manufacturers measure DMD data for fiber in order to qualify the fiber based on meeting OM4 standards. But, any other suitable wavelength may be used.

As used herein, a reference to a single "wavelength" encompasses a range of wavelengths around the single wavelength that accounts for allowable deviations in wavelength normally associated with standards-based DMD measurements at that wavelength and the associated laser sources. For example, for DMD measurements performed at 850 nm and 953 nm, the relevant standards allow for a 3 nm deviation in the wavelength at which the measurement is performed. So, a measurement "at" 850 nm may be performed using a laser with a wavelength in the range 847 nm-853 nm. Similarly, a measurement at 953 nm may be performed using a laser with a wavelength in the range 950 nm-956 nm. Endpoints are included in these ranges. Similarly, other references to the exact values 850 nm and 953 nm include a surrounding range of +/−3 nm, as allowed by the relevant OM4 and OM5 standards.

Minimum Bandwidth at First Wavelength

In step 120, the multimode fiber is selected based on meeting first selection criteria based on DMD data measured at the first wavelength. There are two exemplary "first criterion" that are industry standard for OM4 fibers.

In some embodiments, a first criterion is the application of one or more masks to DMD data measured at 850 nm. The DMD data is compared to one or more masks specified in IEC 60793-1-49: Optical Fibres, Part 1: Measurement Methods and Test Procedures, Section 49: Differential Mode Delay. If the data meets the requirements of any of the masks, the fiber will meet the minimum effective modal bandwidth requirements specified in the OM4 standard for laser input at 850 nm, which is 4700 MHz-km at 850 nm.

In some embodiments, a first criterion is the calculation of minEMBc$_1$ from the DMD data. For this calculation, IEC 60793-1-49 specifies 10 different weightings of DMD traces that correspond to 10 different laser input conditions. These 10 weightings have been selected in the standard to cover a wide range of actual input conditions corresponding to the wide range of power and intensity distributions supplied by different source manufacturers that supply 850 nm VCSEL sources. Based on these weightings, an EMBc$_1$ is calculated for each of the 10 different laser input conditions. The lowest of these 10 EMBc$_1$ is minEMBc$_1$. MinEMBc$_1$ is then compared to the minimum EMB required by the IEC standard, which is 4160 MHz-km at 850 nm for OM4 fiber, after accounting for the factor of 1.13 used when comparing minEMBc values to the values set forth in the IEC standard.

DMD data may also be used to determine whether a fiber meets the OM4 requirements for an overfilled launch. An overfilled launch refers to input light conditions typical of certain types of LEDs used historically with OM4 fiber, where the light source typically launches light uniformly into all modes of a multimode fiber. This use of LEDs as light sources is presently declining in favor of laser sources. But, legacy systems may use LED light sources, and the OM4 standard includes a minimum bandwidth requirement for use with an overfilled launch. For example, DMD data measured at a first wavelength, such as 850 nm for OM4 fiber, may be used to calculate an overfilled launch bandwidth at the first wavelength (OFLc$_1$). For OM4 fiber, the first set of criteria further comprise a criterion requiring that OFLc$_1$ is greater than or equal to 3500 MHz-km.

The methods disclosed herein may be used more generally than using the DMD data measured at 850 nm for OM4 fibers to predict the performance of such fibers at other wavelengths. More generally, the methods may be applied to any selection method where DMD data at a first wavelength is evaluated for whether it is within a predetermined tolerance of a predetermined function. The pre-determined function is desirably an even-ordered polynomial, such that of Equation 3, e.g. Equations 3 through 7.

Using an Even Ordered Polynomial to Predict Fiber Performance at a Second Wavelength In step 130, the multimode fiber is selected based on meeting requirements of the second minimum bandwidth at the second wavelength. But, in step 140, the requirement uses as input DMD data measured at the first wavelength. The requirements are based on a second set of criteria, comprising a second criterion. The second criterion is whether the radial dependence of the differential mode delay data measured at the first wavelength is within a pre-determined tolerance of a pre-determined reference function constructed by concatenating two or more even-order polynomials having the form:

$$\tau(r)_{ref,k} = c_{0,k} + c_{1,k}\left(\frac{r}{a}\right)^2 + c_{2,k}\left(\frac{r}{a}\right)^4$$

Whether the measured data is within a "predetermined tolerance" of the predetermined reference function may be determined in a number of ways. Two such ways involve pre-determined values for the coefficients $c_{0,k}$, $c_{1,k}$, and $c_{2,k}$, obtained from measurement of reference fibers known to be desirable, as described in the Examples.

A first way to use such predetermined coefficients is to determine a value of $\chi^2$ from equations Equations 8 and 9 or similar equations. The predetermined coefficients are used to quantify $\tau(r)_{ref,k}$. The equation may then be applied to measured DMD data for a fiber being evaluated to calculate $\chi^2$. If $\chi^2$ is below a pre-determined threshold, the fiber meets the selection criteria. This methodology is applied herein to the radial ranges 7 microns to 15 microns and 15 microns to 25 microns (for an evaluation where K=3, using a second-order polynomial), and to the radial range 7 microns to 25 microns (for an evaluation where K=2, using a third-order polynomial), but may have broader applicability.

A second way to use such predetermined coefficients is to fit measured DMD data from a fiber being evaluated to a function having the form of Equation 3, for example Equation 5 or Equation 7. A least squares fit is preferred. The coefficients obtained from such a fit may then be compared to a pre-determined range for coefficients $c_{0,k}$, $c_{1,k}$, and $c_{2,k}$, obtained from measurements of fibers known to be desirable. If the coefficients obtained from the fit of measured DMD data from the fiber being evaluated fall within the pre-determined range, the fiber meets the selection criteria. This methodology is applied herein to the radial range 1 micron to 7 microns, but may have broader applicability.

The two evaluation methods described in the preceding paragraphs may be combined when evaluating a particular fiber. For example, the first way may be used to evaluate the radial ranges 7 microns to 15 microns and 15 microns to 25 microns (for an evaluation where K=3, using a second-order polynomial), or the radial range 7 microns to 25 microns (for an evaluation where K=2, using a third-order polynomial). The second way may be used to evaluate the radial range 1 to 7 microns. In this example, the selection criteria would involve meeting both the criteria of the first way of evaluating in the radial range 7 microns to 25+ microns, and the criteria of the second way of evaluating in the radial range 1 to 7+ microns.

Minimum Bandwidth at Second Wavelength

In a step 140, DMD data for the fiber is measured at a second wavelength. In step 150, the multimode fiber is selected based on meeting requirements of the second minimum bandwidth at the second wavelength based on a second set of criteria comprising: a second criterion using as input the DMD data measured at the second wavelength.

DMD Measurement at Second Wavelength

In some embodiments, those fibers selected as likely to meet bandwidth requirements at the second wavelength are subject to DMD measurements performed using laser input at the second wavelength to confirm that the fibers indeed meet these requirements. A third set of criteria may be applied for this confirmation. The third set of criteria include a third criterion using as input the measured differential mode delay (DMD) data for the multimode fiber measured at the second wavelength.

The third set of criteria is based on measurements at the second wavelength, and is used to quantify fiber performance at the second wavelength. The third set of criteria is similar to the first set of criteria, which also uses measurements at a particular wavelength, the first wavelength, to quantify performance at that wavelength. As such, the third set of criteria may be similar in nature to the first set of criteria, but at a different wavelength and likely with different specific parameters.

For example, the third set of criteria may include a criterion based on calculating an effective minimum bandwidth at the second wavelength ($minEMBc_2$) from the DMD data measured at the second wavelength. The third criterion comprises a requirement that $minEMBc_2$ is greater than or equal to a second threshold value. As with the first set of criteria, $minEMBc_2$ may be standards-based, such as the ISO/IEC standard for $minEMBc_2$ at 953 nm for an OM5 fiber.

Also for example, the third set of criteria may include a criterion based on applying a third mask to the DMD data measured at the second wavelength. The third criterion comprises a requirement that the DMD data measured at the second wavelength passes the parameters of the third mask. As with the first set of criteria, the mask may be standards-based, such as a standard mask defined by IEC 60793-1-49 for an OM5 fiber at 953.

The OM4 and OM5 standards-based criteria for fiber bandwidth performance are based on applying a calculation and/or a mask to data measured at a particular wavelength to quantify performance at that wavelength. These standards do not provide a way to quantify performance at a wavelength different from the wavelength at which data was measured.

In a manner similar to that described for the first wavelength, DMD data measured at the second wavelength may also be used to determine whether a fiber meets requirements for an overfilled launch at the second wavelength, such as the OM5 requirements for an overfilled launch at 953 nm. For example, DMD data measured at a second wavelength, such as 953 nm for OM5 fiber, may be used to calculate an overfilled launch bandwidth at the second wavelength ($OFLc_2$). For OM5 fiber, the criteria is that $OFLc_2$ is greater than or equal to 1850 MHz-km at 953 nm.

Applying the method described in FIG. 1, for example, allows a fiber manufacturer to reduce the number of measurements performed at 953 nm to qualify OM5 fiber, by removing from consideration prior to measurement at 953 nm those OM4 fibers unlikely to meet the OM5 standard. Such a selection method would also allow a fiber manufacturer to select, for example, a fiber likely to meet customized customer requirements based on stored DMD data measured at 850 nm, and measure that fiber against the customer requirements.

OM4 and OM5 Fiber

In a non-limiting example, it is desired to select fiber likely to meet the OM5 standard based on the DMD measurements used to qualify the fiber based on meeting the OM4 standard. In this example, the first wavelength is 850 nm and the second wavelength is 953 nm. Fiber meeting the OM4 standard may be selected from a broader set of fiber based on DMD measurements performed at 850 nm and industry standard masks and/or calculation of $minEMBc_1$. The DMD measurements performed at 850 nm may then be used to determine whether the radial dependence of the differential mode delay data measured at the first wavelength is within a pre-determined tolerance of a pre-determined reference function constructed by concatenating two or more even-order polynomials having the form of Equation 3, e.g., Equations 3 through 7.

The third criterion in selecting OM5 fiber may be, for example, the use of a mask applied to DMD measurements performed at the second wavelength, or the calculation of $minEMBc_2$ from DMD measurements performed at the second wavelength. The measurement of DMD data at the second wavelength may be performed only for fiber that meet the second criterion, thereby reducing the resources spent measuring fiber not likely to qualify as OM5, i.e., fiber that did not meet the second criterion.

Optional Additional Criterion

In some embodiments, "subset" language is used to describe the results of a selection process. In these embodiments, the first subset is a subset of the plurality of multimode fibers, which means that the first subset includes all or just some of the plurality of fiber. Similarly, the second subset is a subset of the first subset, which means that the second subset includes all or just some of the fibers in the first subset. The third subset is a subset of the second subset, which means that the third subset includes all or just some of the fibers in the second subset.

System

In some embodiments, a system includes components for selecting a multimode fiber meeting requirements of a first minimum bandwidth at a first wavelength and a second minimum bandwidth at a second wavelength greater than the first wavelength. The system comprises:

a measurement device configured to measure differential mode delay (DMD) data for the multimode fiber at the first wavelength, wherein the DMD data comprises output laser pulse data as a function of the radial position of an input laser pulse having the first wavelength;

a first selection device configured to select the multimode fiber if the multimode fiber passes a first mask applied to the DMD data for the multimode fiber at the first wavelength;

a second selection device configured to select the multimode fiber if the the radial or mode group number dependence of the differential mode delay data measured at the first wavelength is within a pre-determined tolerance of a pre-determined reference function constructed by concatenating two or more even-order polynomials having the form of Equation 3 e.g., Equations 3 through 7.

The processor device, first selection device and second selection device may be the same device, or different devices in different permutations. For example, a single computer may be specifically configured to transform the DMD data and select the fiber. Or, a first computer may be configured as the first selection device, while a second computer may be configured as the processor device and second selection device. Other permutations are possible.

One advantage of transforming the delays to mode group space is that this method explicitly incorporates changes in the number of mode groups with wavelength. For example, there are nominally 18 mode groups at 850 nm but only 16 at 953 nm. An algorithm solely based on the radial delays at 850 nm cannot easily deconvolve the effects of the $17^{th}$ and $18^{th}$ mode groups from the higher order mode delays, and this is essentially obtaining an accurate calculation or estimation of the effective modal bandwidth at 853 nm. As used herein, "deconvolving" refers to an algorithm or process for selecting the time delays from pulse data, such as measured DMD pulse data. A second advantage is that the mask clearly delineates the behaviors of the LP01 mode, the lower order mode groups (including 2 through 5) and the higher order mode groups (including 12 through 15). We have observed that there is often a delay "step" between the lower and higher order mode groups, and different masks for the lower order mode groups and higher order mode groups accommodates this delay structure.

EXAMPLES

Example A

Twelve premium wideband fibers meeting the OM5 standard were selected. DMD measurements were performed on these fibers at both 850 nm and 953 nm. The fibers were verified to meet the OM5 standards. These twelve fibers had minEMBc values well above the OM5 specification—the fibers are "premium" relative to a regular OM5 fiber.

DMD measurements were performed on each of the twelve fibers at radial positions ranging from 1 micron to 25 microns, with a 2 micron increment between measurements.

For each radial position on each fiber, a centroid delay was calculated, and referenced to the centroid delay at 7 microns, which encompasses the portion of the core where most of the optical power in the LP01 and LP11 modes propagates.

These centroid delays in units of ns/km are shown in Table 1, along with their average. The centroid delays for Fiber Examples 1, 5, 8 and 10 are plotted in FIG. 2, along with the average centroid delay (plot with solid circles). The relative centroid delays in the radial range between 1 and 7 microns vary between −0.02 and 0.2 ns/km for these twelve fiber examples and can have positive or negative slopes. The relative centroid delays in the radial range between 7 and 15 microns generally decrease smoothly to a minimum value between about −0.06 and 0 ns/km. The relative centroid delays in the radial range between 15 and 25 microns decrease smoothly to a minimum value between about −0.08 and −0.02 ns/km and either plateau or increase slightly near the outside of the fiber core. These centroid delay data supports the separation of the k=1 terms in Equations 5 and 7 (for radial values less than about 7 microns) from the k=2 and k=3 terms (for radial values greater than about 7 microns).

Example B

A third order polynomial having the form of Equation 7 was fit to the centroid data for each of the twelve example fibers, and to the average centroid data. This fit was performed over the radial range:
k=1: $r_{1,1}$=0 microns; $r_{2,1}$=7 microns;
k=2: $r_{1,2}$=7 microns; $r_{2,2}$=25 microns.

The fit results provided in Table 2A for k=1 indicate that, in preferred embodiments, $c_{01}$ is between −0.02 and 0.2 ns/km, $c_{11}$ is between −1.5 and 0.5 ns/km and $c_{21}$ is between −2 and 8 ns/km and $c_{31}$ is 0. These fit results provided in Table 2B indicate that, in preferred embodiments, $c_{02}$ is between −0.02 and 0.1 ns/km, $c_{12}$ is between −0.3 and 0.1 ns/km, $c_{22}$ is between −0.5 and 0.3 ns/km and $c_{23}$ is between −0.1 and 0.4 ns/km.

TABLE 2A

|  | c01 (ns/km) | c11 (ns/km) | c21 (ns/km) |
| --- | --- | --- | --- |
| Fiber Example 1 | −0.0129 | 0.2431 | −1.0023 |
| Fiber Example 2 | −0.004 | 0.0929 | −0.5329 |
| Fiber Example 3 | 0.0131 | −0.2643 | 1.2379 |
| Fiber Example 4 | −0.0027 | −0.0116 | 0.5985 |
| Fiber Example 5 | 0 | 0.0631 | −0.7997 |
| Fiber Example 6 | 0.0251 | −0.526 | 2.6348 |
| Fiber Example 7 | 0.0234 | −0.5979 | 3.8326 |
| Fiber Example 8 | 0.0404 | −1.0442 | 6.7728 |
| Fiber Example 9 | 0.0284 | −0.8237 | 5.9135 |
| Fiber Example 10 | 0.0239 | −0.4541 | 1.9134 |
| Fiber Example 11 | 0.0139 | −0.2883 | 1.4239 |
| Fiber Example 12 | 0.0138 | −0.2471 | 0.9121 |
| Average | 0.0135 | −0.3215 | 1.9087 |
| Minimum | −0.0129 | −1.0442 | −1.0023 |
| Maximum | 0.0404 | 0.2431 | 6.7728 |

TABLE 1

| r (microns) | (r/a)*(r/a) | Fiber Example 1 | Fiber Example 2 | Fiber Example 3 | Fiber Example 4 | Fiber Example 5 | Fiber Example 6 |
| --- | --- | --- | --- | --- | --- | --- | --- |
| 1 | 0.0016 | −0.0126 | −0.0039 | 0.0127 | −0.0025 | 0.0002 | 0.0247 |
| 3 | 0.0144 | −0.0095 | −0.0028 | 0.0096 | −0.0032 | 0.0006 | 0.0174 |
| 5 | 0.04 | −0.0049 | −0.0012 | 0.0045 | −0.0019 | 0.0013 | 0.0087 |
| 7 | 0.0784 | 0.0000 | 0.0000 | 0.0000 | 0.0000 | 0.0000 | 0.0000 |
| 9 | 0.1296 | 0.0028 | −0.0007 | −0.0027 | 0.0011 | −0.0019 | −0.0047 |
| 11 | 0.1936 | −0.0003 | −0.0057 | −0.0054 | −0.0016 | −0.0057 | −0.0037 |
| 13 | 0.2704 | −0.0101 | −0.0140 | −0.0119 | −0.0093 | −0.0137 | −0.0057 |
| 15 | 0.36 | −0.0247 | −0.0235 | −0.0242 | −0.0216 | −0.0271 | −0.0158 |
| 17 | 0.4624 | −0.0374 | −0.0316 | −0.0380 | −0.0345 | −0.0410 | −0.0308 |
| 19 | 0.5776 | −0.0454 | −0.0385 | −0.0475 | −0.0430 | −0.0526 | −0.0421 |
| 21 | 0.7056 | −0.0481 | −0.0433 | −0.0539 | −0.0471 | −0.0622 | −0.0479 |
| 23 | 0.8464 | −0.0475 | −0.0439 | −0.0575 | −0.0485 | −0.0675 | −0.0497 |
| 25 | 1 | −0.0404 | −0.0389 | −0.0494 | −0.0447 | −0.0670 | −0.0434 |

| r (microns) | (r/a)*(r/a) | Fiber Example 7 | Fiber Example 8 | Fiber Example 9 | Fiber Example 10 | Fiber Example 11 | Fiber Example 12 | Average |
| --- | --- | --- | --- | --- | --- | --- | --- | --- |
| 1 | 0.0016 | 0.0227 | 0.0393 | 0.0278 | 0.0236 | 0.0136 | 0.0135 | 0.0133 |
| 3 | 0.0144 | 0.0151 | 0.0257 | 0.0165 | 0.0170 | 0.0097 | 0.0102 | 0.0089 |
| 5 | 0.04 | 0.0058 | 0.0100 | 0.0056 | 0.0092 | 0.0048 | 0.0055 | 0.0040 |
| 7 | 0.0784 | 0.0000 | 0.0000 | 0.0000 | 0.0000 | 0.0000 | 0.0000 | 0.0000 |
| 9 | 0.1296 | −0.0045 | −0.0028 | −0.0050 | −0.0058 | −0.0047 | −0.0041 | −0.0028 |
| 11 | 0.1936 | −0.0101 | −0.0015 | −0.0162 | −0.0137 | −0.0093 | −0.0068 | −0.0067 |
| 13 | 0.2704 | −0.0186 | −0.0049 | −0.0262 | −0.0221 | −0.0151 | −0.0100 | −0.0135 |
| 15 | 0.36 | −0.0306 | −0.0227 | −0.0393 | −0.0345 | −0.0225 | −0.0196 | −0.0255 |
| 17 | 0.4624 | −0.0427 | −0.0414 | −0.0525 | −0.0484 | −0.0300 | −0.0338 | −0.0385 |
| 19 | 0.5776 | −0.0515 | −0.0522 | −0.0567 | −0.0584 | −0.0364 | −0.0439 | −0.0474 |
| 21 | 0.7056 | −0.0564 | −0.0598 | −0.0552 | −0.0645 | −0.0403 | −0.0493 | −0.0523 |
| 23 | 0.8464 | −0.0586 | −0.0612 | −0.0567 | −0.0687 | −0.0413 | −0.0476 | −0.0541 |
| 25 | 1 | −0.0478 | −0.0574 | −0.0544 | −0.0681 | −0.0382 | −0.0345 | −0.0487 |

TABLE 2B

| | c02 (ns/km) | c12 (ns/km) | c22 (ns/km) | c32 (ns/km) |
|---|---|---|---|---|
| Fiber Example 1 | 0.0096 | −0.0487 | −0.1759 | 0.1764 |
| Fiber Example 2 | 0.0081 | −0.0714 | −0.0697 | 0.0947 |
| Fiber Example 3 | 0.0038 | −0.0178 | −0.2362 | 0.2015 |
| Fiber Example 4 | 0.0069 | −0.0323 | −0.1822 | 0.1644 |
| Fiber Example 5 | 0.0058 | −0.0364 | −0.2091 | 0.1737 |
| Fiber Example 6 | −0.0027 | 0.0486 | −0.3388 | 0.2507 |
| Fiber Example 7 | 0.0078 | −0.0801 | −0.1226 | 0.1474 |
| Fiber Example 8 | 0.0014 | 0.0298 | −0.3648 | 0.2786 |
| Fiber Example 9 | 0.0199 | −0.2323 | 0.2045 | −0.0455 |
| Fiber Example 10 | 0.0112 | −0.1297 | −0.0222 | 0.0733 |
| Fiber Example 11 | 0.0660 | −0.0824 | −0.0152 | 0.0531 |
| Fiber Example 12 | −0.0002 | 0.0174 | −0.3000 | 0.2490 |
| Average | 0.0065 | −0.0529 | −0.1527 | 0.1515 |
| Minimum | −0.0027 | −0.2323 | −0.3648 | −0.0455 |
| Maximum | 0.0660 | 0.0486 | 0.2045 | 0.2786 |

Figure 3A:
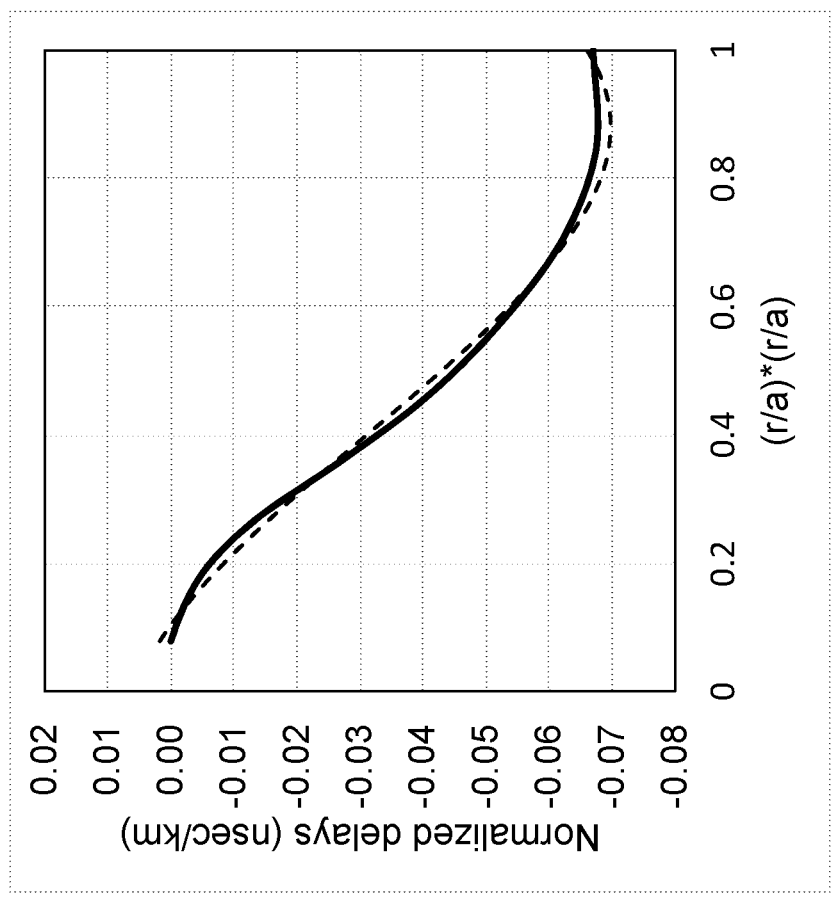
FIG. 3A shows a third order polynomial fit (solid line) to the averaged plot of FIG. 2 (solid circles) over the range 7 microns<=r<=25 microns.

FIG. 3A shows a plot of the third order polynomial fit (solid line) using the coefficients $c_{02}$, $c_{12}$, $c_{22}$ and $c_{32}$ from TABLE 2A for the averaged curve, compared to the averaged curve itself (solid circles), over the range 7 microns$\leq$r$\leq$25 microns. FIG. 3A confirms that the third order polynomial fit is a good fit. As such, the fit may be used as a pre-determined reference function to determine whether DMD measurements from a fiber are within a pre-determined tolerance of the pre-determined reference function fibers. If the DMD measurements meet this criterion, the fiber is likely to meet OM5 standards.

This third order polynomial may be used in conjunction with the second order polynomial fit of Example C for the range 0 microns$\leq$r$\leq$7 microns, to the extent a reference curve is needed for that range. This second order polynomial may be described as a third order polynomial with $c_{3,1}=0$ ns/km if needed, to simplify the summation notation.

Example C

A second order polynomial having the form of Equation 5 was fit to the centroid data for each of the twelve example fibers, and to the average centroid data. This fit was performed for three radial ranges:

k=1: $r_{1,1}=0$ microns; $r_{2,1}=7$ microns;

k=2: $r_{1,2}=7$ microns; $r_{2,2}=15$ microns;

k=3: $r_{1,3}=15$ microns; $r_{2,3}=25+$ microns.

The fit results provided in Table 2A for k=1 indicate that, in preferred embodiments, $c_{01}$ is between −0.02 and 0.2 ns/km, $c_{11}$ is between −1.5 and 0.5 ns/km and $c_{21}$ is between −2 and 8 ns/km and $c_{3,1}=0$ ns/km. The fit results provided in Table 3A for k=2 indicate that, in preferred embodiments, $c_{02}$ is between −0.02 and 0.02 ns/km, $c_{12}$ is between −0.2 and 0.01 ns/km and $c_{22}$ is between −0.6 and 0.01 ns/km. The fit results provided in Table 3B for k=3 indicate that, in preferred embodiments, $c_{03}$ is between 0.01 and 0.1 ns/km, $c_{13}$ is between −0.35 and −0.1 ns/km and $c_{23}$ is between 0.05 and 0.25 ns/km.

TABLE 3A

| | c02 (ns/km) | c12 (ns/km) | c22 (ns/km) |
|---|---|---|---|
| Fiber Example 1 | −0.0054 | 0.1155 | −0.4735 |
| Fiber Example 2 | 0.0024 | −0.0089 | −0.1785 |
| Fiber Example 3 | −0.0008 | 0.0224 | −0.2413 |
| Fiber Example 4 | −0.0034 | 0.0768 | −0.3554 |
| Fiber Example 5 | −0.0004 | 0.0258 | −0.2777 |
| Fiber Example 6 | −0.0031 | 0.0325 | −0.182 |
| Fiber Example 7 | 0.0047 | −0.0522 | −0.1273 |
| Fiber Example 8 | −0.0094 | 0.1325 | −0.4631 |
| Fiber Example 9 | 0.011 | −0.1311 | −0.0245 |
| Fiber Example 10 | 0.0081 | −0.1012 | −0.0464 |
| Fiber Example 11 | 0.006 | −0.08 | 0.0031 |
| Fiber Example 12 | 0.0013 | −0.0187 | −0.1049 |
| Average | 0.0009 | 0.0011 | −0.206 |
| Minimum | −0.0094 | −0.1311 | −0.4735 |
| Maximum | 0.0110 | 0.1325 | 0.0031 |

TABLE 3B

| | c03 (ns/km) | c13 (ns/km) | c23 (ns/km) |
|---|---|---|---|
| Fiber Example 1 | 0.038 | −0.2321 | 0.1541 |
| Fiber Example 2 | 0.0255 | −0.1753 | 0.1107 |
| Fiber Example 3 | 0.0491 | −0.2627 | 0.1637 |
| Fiber Example 4 | 0.0381 | −0.2167 | 0.1343 |
| Fiber Example 5 | 0.0428 | −0.2419 | 0.132 |
| Fiber Example 6 | 0.0621 | −0.281 | 0.1756 |
| Fiber Example 7 | 0.0406 | −0.257 | 0.169 |
| Fiber Example 8 | 0.0601 | −0.2998 | 0.1831 |
| Fiber Example 9 | 0.0003 | −0.1507 | 0.0978 |
| Fiber Example 10 | 0.0274 | −0.2188 | 0.1237 |
| Fiber Example 11 | 0.0196 | −0.1503 | 0.0924 |
| Fiber Example 12 | 0.066 | −0.3142 | 0.2135 |
| Average | 0.0391 | −0.2334 | 0.1458 |
| Minimum | 0.0003 | −0.3142 | 0.0924 |
| Maximum | 0.0660 | −0.1503 | 0.2135 |

Figure 3B:
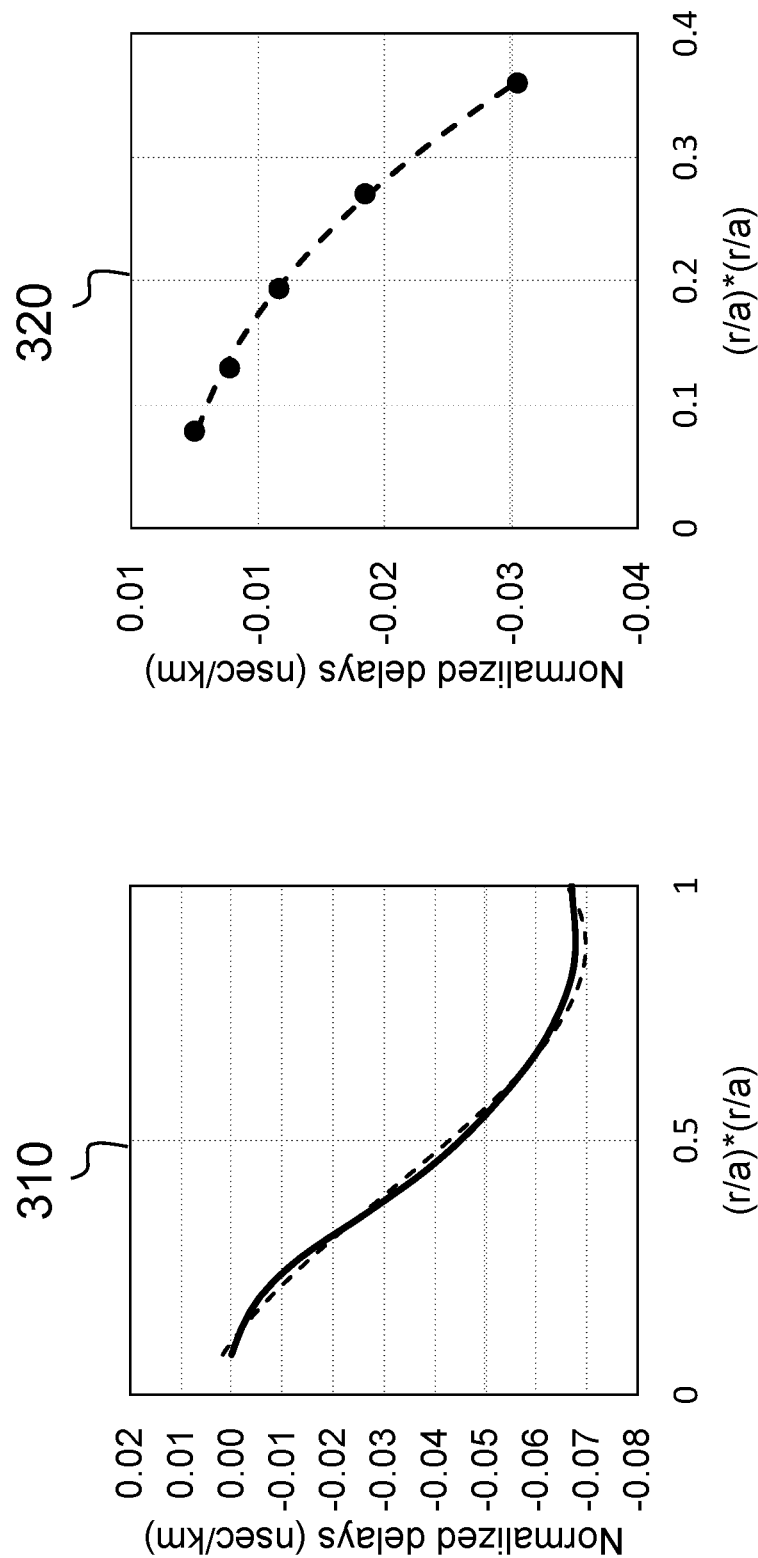
FIG. 3B shows: a plot 310 of a second order polynomial fit (solid line) to the averaged plot of FIG. 2 (solid circles) over the range 7 microns<=r<=15 microns; and a plot 320 of a second order polynomial fit (dotted line) to the averaged plot of FIG. 2 (solid circles over the range 15 microns<=r<=25 microns.

FIG. 3B shows: a plot 310 of the second order polynomial fit (solid line) using the coefficients c02, c12, and c22 from TABLE 3A for the averaged curve, compared to the averaged curve itself (solid circles), over the range 7 microns$\leq$r$\leq$15 microns. FIG. 3B also shows a plot 320 of the second order polynomial fit (dotted line) using the coefficients c03, c13, and c23 from TABLE 3B for the averaged curve, compared to the averaged curve itself (solid circles), over the range 15 microns$\leq$r$\leq$25 microns. FIG. 3B confirms that the second order polynomial fit is a good fit. As such, the fit may be used as a pre-determined reference function to determine whether DMD measurements from a fiber are within a pre-determined tolerance of the pre-determined reference function fibers. If the DMD measurements meet this criterion, the fiber is likely to meet OM5 standards.

Example D

A sample set of 121 OM4 fibers was considered. 48 of the sample set were identified as OM5 MMF based on minEMBc values derived from 953 nm DMD measurements. The remaining 73 fibers did not meet the OM5 specification. The twelve premium fibers of Examples A-C were included in the 48 fibers meeting the OM5 specification.

$\chi^2$ was calculated for each fiber using Equations 7 and 9. The radial ranges and the coefficients from Example B were used. (the third order polynomial fit) The weighting was set to $w_1=0$, and $w_2=w_3=1$, which excludes the radial range below 7 microns. The centroid delays in the radial range from r=0 to r=7 microns are constrained by the k=1 polynomial described in Examples B and C.

Table 4 below summarizes the results and illustrates that a threshold of $\chi^2=3$ $(ns/km)^2$ results in a 27.4% (100%–72.6%) decrease in the number of superfluous measurements with a minimal reduction (4.2%) in the number of samples that would have met the MinEMBc requirement but exceeded the threshold based on the least squares fit.

TABLE 4

| Threshold $(ns/km)^2$ | False Positives | False Negatives |
|---|---|---|
| 2 | 47.9% | 10.4% |
| 2.5 | 63.0% | 6.3% |
| 3 | 72.6% | 4.2% |

Example E

DMD measurements were performed at 850 nm on ten fibers drawn from two different preforms at radial positions ranging from 1 micron to 25 microns, with a 2 micron increment between measurements. Fiber Examples 13.1 through 13.7 were drawn from one preform. Fiber Examples 14.1 through 14.3 were drawn from another preform.

Figure 7:
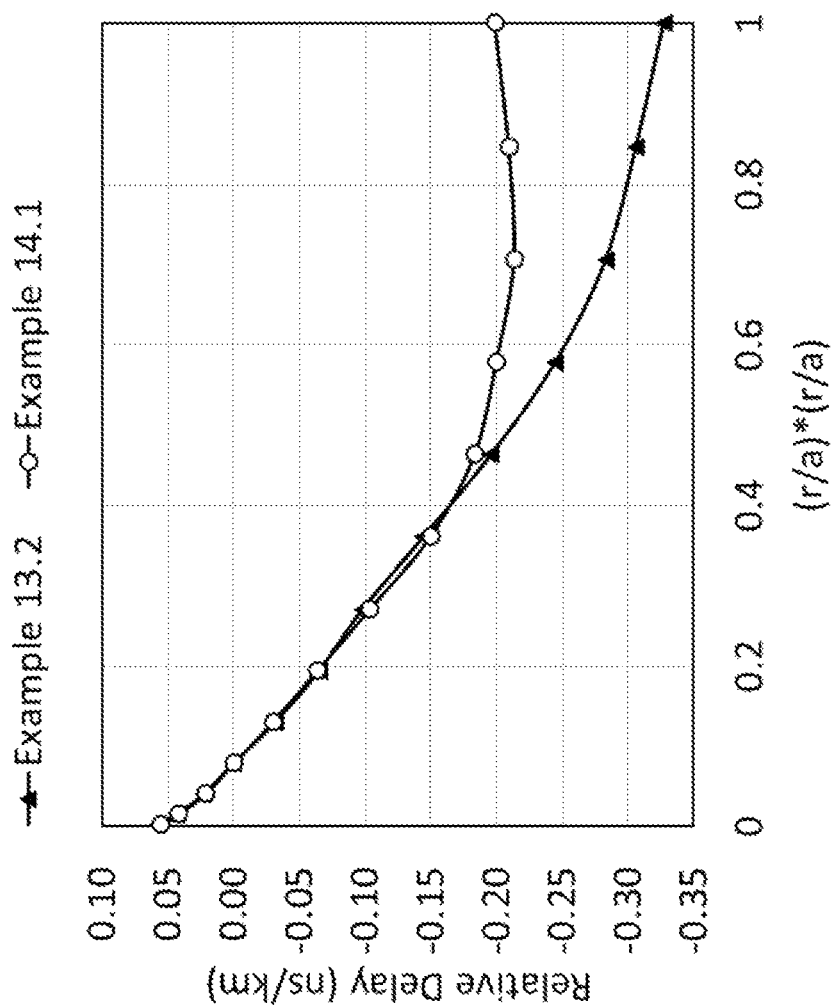
FIG. 7 shows a plot of relative delay v. normalized radius squared, for two specific fibers.

Based on these measurements at 850 nm, FIG. 7 shows a plot of relative delay v. normalized radius squared, for two specific fibers, Fiber Example 13.2 and Fiber Example 14.1.

For each radial position for each fiber drawn from each preform, a centroid delay was calculated, and referenced to the centroid delay at 7 microns, which encompasses the portion of the core where most of the optical power in the LP01 and LP11 modes propagates.

These centroid delays in units of ns/km are shown in Table 5, along with their average. The relative centroid delays in the radial range between 1 and 7 microns vary between 0.02 and 0.1 ns/km for these ten examples and have positive slopes. The relative centroid delays in the radial range between 7 and 15 microns generally decrease smoothly to a minimum value between about −0.2 and −0.1 ns/km. The relative centroid delays in the radial range between 15 and 25 microns decrease smoothly to a minimum value between about −0.4 and −0.1 ns/km and either plateau or increase slightly near the outside of the fiber core. These centroid delay data supports the separation of the k=1 terms in Equations 5 and 7 (for radial values less than about 7 microns) from the k=2 and k=3 terms (for radial values greater than about 7 microns).

TABLE 5

| r (microns) | (r/a)*(r/a) | Fiber Example 13.2 | Fiber Example 14.1 | Average |
|---|---|---|---|---|
| 1 | 0.0016 | 0.0580 | 0.0555 | 0.0568 |
| 3 | 0.0144 | 0.0435 | 0.0420 | 0.0428 |
| 5 | 0.04 | 0.0230 | 0.0220 | 0.0225 |
| 7 | 0.0784 | 0.0000 | 0.0000 | 0.0000 |
| 9 | 0.1296 | −0.0315 | −0.0295 | −0.0305 |
| 11 | 0.1936 | −0.0650 | −0.0635 | −0.0643 |
| 13 | 0.2704 | −0.0980 | −0.1035 | −0.1008 |
| 15 | 0.36 | −0.1440 | −0.1495 | −0.1468 |
| 17 | 0.4624 | −0.1955 | −0.1835 | −0.1895 |
| 19 | 0.5776 | −0.2445 | −0.2000 | −0.2223 |
| 21 | 0.7056 | −0.2830 | −0.2135 | −0.2483 |
| 23 | 0.8464 | −0.3060 | −0.2095 | −0.2578 |
| 25 | 1 | −0.3270 | −0.1990 | −0.2630 |

Example F

A third order polynomial having the form of Equation 7 was fit to the centroid data for fiber examples 13.2 and 14.1, and to the average centroid data. This fit was performed over the radial range:
k=1: $r_{1,1}=0$ microns; $r_{2,1}=7$ microns;
k=2: $r_{1,2}=7$ microns; $r_{2,2}=25$ microns.
The fit results provided in Table 6A for k=1 indicate that, in preferred embodiments, $c_{01}$ is between 0.02 and 0.1 ns/km, $c_{11}$ is between −1.5 and −0.5 ns/km and $c_{21}$ is between 2 and 6 ns/km and $c_{31}$ is 0. These fit results provided in Table 6B indicate that, in preferred embodiments, $c_{02}$ is between 0.02 and 0.1 ns/km, $c_{12}$ is between −1.0 and −0.2 ns/km, $c_{22}$ is between −0.2 and 1.0 ns/km and $c_{23}$ is between −0.2 and 0.4 ns/km.

TABLE 6A

|  | c01 | c11 | c21 |
|---|---|---|---|
| Fiber Example 13.2 | 0.0592 | −1.0894 | 4.2771 |
| Fiber Example 14.1 | 0.0568 | −1.0407 | 4.0459 |
| Average | 0.0580 | −1.0651 | 4.1615 |

TABLE 6B

|  | c02 | c12 | c22 | c23 |
|---|---|---|---|---|
| Fiber Example 13.2 | 0.0417 | −0.5467 | −0.0043 | 0.1846 |
| Fiber Example 14.1 | 0.0640 | −0.8162 | 0.7040 | −0.1490 |
| Average | 0.0529 | −0.6815 | 0.3499 | 0.0178 |

Example G

A second order polynomial having the form of Equation 5 was fit to the centroid data for fiber examples 13.2 and 14.1, and to the average centroid data. This fit was performed for three radial ranges:
k=1: $r_{1,1}=0$ microns; $r_{2,1}=7$ microns;
k=2: $r_{1,2}=7$ microns; $r_{2,2}=15$ microns;
k=3: $r_{1,3}=15$ microns; $r_{2,3}=25+$ microns.
The fit results provided in Table 6A for k=1 indicate that, in preferred embodiments, $c_{01}$ is between 0.02 and 0.1 ns/km, $c_{11}$ is between −1.5 and −0.5 ns/km and $c_{21}$ is between 2 and 8 ns/km and $c_{3,1}=0$ ns/km. The fit results provided in Table 7A for k=2 indicate that, in preferred embodiments, $c_{02}$ is between 0.02 and 0.06 ns/km, $c_{12}$ is between −0.8 and −0.2 ns/km and $c_{22}$ is between 0.0 and 0.3 ns/km. The fit results provided in Table 7B for k=3 indicate that, in preferred embodiments, $c_{03}$ is between 0.0 and 0.2 ns/km, $c_{13}$ is between −1.0 and −0.4 ns/km and $c_{23}$ is between 0.2 and 0.5 ns/km.

TABLE 7A

|  | c02 | c12 | c22 |
|---|---|---|---|
| Fiber Example 13.2 | 0.0434 | −0.5893 | 0.2 |
| Fiber Example 14.1 | 0.0443 | −0.5795 | 0.1155 |
| Average | 0.0439 | −0.5844 | 0.1578 |

TABLE 7B

|  | c03 | c13 | c23 |
|---|---|---|---|
| Fiber Example 13.2 | 0.096 | −0.8099 | 0.3891 |
| Fiber Example 14.1 | 0.0014 | −0.5556 | 0.357 |
| Average | 0.0487 | −0.6828 | 0.3731 |

Example H

A third order polynomial having the form of Equation 7 was fit to the centroid data for fiber examples 13.2 and 14.1, and to the average centroid data. This fit was performed over the radial range:

k=2: $r_{1,2}$=0 microns; $r_{2,2}$=25 microns.

The fit results provided in Table 8 for k=2 indicate that, in preferred embodiments, $c_{02}$ is between 0.3 and 0.7 ns/km, $c_{12}$ is between −1.0 and −0.5 ns/km, $c_{22}$ is between 0.0 and 0.8 ns/km and $c_{23}$ is between −0.2 and 0.2 ns/km.

TABLE 8

|  | c02 | c12 | c22 | c23 |
|---|---|---|---|---|
| Fiber Example 13.2 | 0.0520 | −0.6287 | 0.1613 | 0.0894 |
| Fiber Example 14.1 | 0.0553 | −0.7532 | 0.5825 | −0.0810 |
| Average | 0.0537 | −0.6910 | 0.3719 | 0.0042 |

DMD measurements at both 953 nm and 1000 nm were then performed on fiber examples 13.2 and 14.1, and the MinEMB values are given in TABLE 9. Each of the measured fibers has minEMB values greater than 4000 MHz-km at both 953 MHz-km and 1000 MHz-km. The measured minEMB values at 1000 nm are also higher than the measured values at 953 nm, which indicates that the peak bandwidth is located at a wavelength greater than 953 nm. These fibers are suitable for use for multimode optical transmission systems operating at long wavelengths. For example, they can be used at one or more wavelengths in the range between and including 980 and 1070 nm, for example at 980 nm (or 977 nm-983 nm), 1000 nm (or 997 nm-1003 nm), 1020 nm (or 1017 nm-1023 nm) or 1064 nm (or 1061 nm-1067 nm), or in another example, at 990 nm (or 987 nm-993 nm), 1015 nm (or 1012 nm-1018 nm), 1040 nm (or 1037 nm-1043 nm) and 1065 nm (or 1062 nm-1068 nm). The fibers may be used at any other wavelength ranges that are a subrange starting at any integer wavelength in the range 980 nm to 1070 nm and having a range length of 6 nm.

CONCLUSION

Those skilled in the relevant art will recognize and appreciate that many changes can be made to the various embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular embodiments only and is not intended to be limiting. Features shown in the drawing are illustrative of selected embodiments of the present description and are not necessarily depicted in proper scale. These drawing features are exemplary, and are not intended to be limiting.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

What is claimed is:

1. A method for selecting fibers meeting requirements of a second minimum bandwidth at a second wavelength based on differential mode delay data measured at a first wavelength different from the second wavelength, the method comprising:

measuring the differential mode delay (DMD) data for the multimode fiber at the first wavelength, wherein the DMD data comprises output laser pulse data as a

TABLE 9

|  | MinEMB at 850 nm (MHz-km) | Overfilled Bandwidth at 850 nm (MHz-km) | Overfilled Bandwidth at 1300 nm (MHz-km) | MinEMBc at 953 nm (MHz-km) | MinEMBc at 1000 nm (MHz-km) |
|---|---|---|---|---|---|
| Fiber Example 13.1 | 1605 | 1617 | 916 |  |  |
| Fiber Example 13.2 | 1519 | 1614 | 890 | 8086 | 9883 |
| Fiber Example 13.3 | 1645 | 1915 | 845 |  |  |
| Fiber Example 13.4 | 1698 | 1992 | 893 |  |  |
| Fiber Example 13.5 | 1534 | 2138 | 833 |  |  |
| Fiber Example 13.6 | 1362 | 2744 | 834 |  |  |
| Fiber Example 13.7 | 1637 | 1402 | 845 |  |  |
| Fiber Example 14.1 | 1461 | 1967 | 705 | 4909 | 4996 |
| Fiber Example 14.2 | 1600 | 2591 | 777 |  |  |
| Fiber Example 14.3 | 1627 | 2388 | 783 |  |  | function of the radial position of an input laser pulse having the first wavelength;

selecting the multimode fiber based on meeting requirements of the second minimum bandwidth at the second wavelength based on a second set of criteria, comprising a second criterion comprising:

the radial dependence of the differential mode delay data measured at the first wavelength being within a pre-determined tolerance of a pre-determined reference function constructed by concatenating two or more even-order polynomials having the form:

$$\tau(r)_k = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \leq r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={1 . . . K} where K is 2 or 3.

2. The method of claim 1, wherein the radial dependence of the differential mode delay data measured at the first wavelength is determined using a centroid of the data measured for each value of r.

3. The method of claim 1, wherein the radial dependence of the differential mode delay data measured at the first wavelength is determined using a peak of the data for measured for each value of r.

4. The method of claim 1, wherein the radial dependence of the differential mode delay data measured at the first wavelength is determined by:
deconvolving the DMD data measured at the first wavelength to determine mode group delay data $\tau_g$;
reconvolving the mode group delay data $\tau_g$ with a theoretical P×g matrix to determine smoothed differential mode delay data in radial space;
determining the radial dependence of the differential mode delay data measured at the first wavelength using a centroid of the data measured for each value of r.

5. The method of claim 1, wherein, for k=1:
$r_{1,1}$=0 microns and $r_{2,1}$=7+ microns;
for a radial range defined by $r_{1,1}$ and $r_{2,1}$, the radial dependence of the differential mode delay data measured at the first wavelength is within a pre-determined tolerance of a pre-determined reference function when a least-squares fit of the differential mode delay data to a function having the form:

$$\tau(r)_{ref,k} = c_{0,k} + c_{1,k}\left(\frac{r}{a}\right)^2 + c_{2,k}\left(\frac{r}{a}\right)^4$$

has coefficients:
−0.02 ns/km≤$c_{01}$≤0.2 ns/km;
−1.5 ns/km≤$c_{11}$≤0.5 ns/km; and
−2.0≤ns/km≤$c_{21}$≤8.0 ns/km.

6. The method of claim 1, wherein:
K=3;
for k=2 and k=3, the pre-determined tolerance $\chi^2$ is:

$$\chi^2 = 10^4 \left[\sum_{k=2}^{K}\sum_{r=r_{1,k}}^{r=r_{2,k}} w_k(\tau(r)_{meas} - \tau(r)_{ref,k})^2\right] / \left[\sum_{k=2}^{K}\sum_{r=r_{1,k}}^{r=r_{2,k}} w_k\right]$$

$\tau(r)_{meas}$ is measured delay at position r;
$\tau(r)_{ref,k}$ is reference delay at position r in interval k:

$$\tau(r)_{ref,k} = c_{0,k} + c_{1,k}\left(\frac{r}{a}\right)^2 + c_{2,k}\left(\frac{r}{a}\right)^4$$

r is radial position in microns;
$w_k$ is a weighting for each of the k regions (k=2 . . . K), where $w_2$=$w_3$=1;
a is 25 microns;
$r_{1,2}$=7 microns;
$r_{2,2}$=15 microns;
$r_{1,3}$=15 microns;
$r_{2,3}$=25+ microns;
for k=2:
$c_{0,2}$=−0.02 to 0.02 ns/km;
$c_{1,2}$=−0.2 to 0.01 ns/km;
$c_{2,2}$=−0.6 to 0.01 ns/km;
for k=3;
$c_{0,3}$=0.01 to 0.1 ns/km;
$c_{1,3}$=−0.35 to −0.1 ns/km;
$c_{2,3}$=0.05 to 0.25 ns/km.

7. The method of claim 6, wherein:
for k=2:
$c_{0,2}$=0.0009 ns/km;
$c_{1,2}$=0.0011 ns/km;
$c_{2,2}$=−0.206 ns/km;
for k=3;
$c_{0,3}$=0.0391 ns/km;
$c_{1,3}$=−0.233 ns/km;
$c_{2,3}$=0.146 ns/km.

8. The method of claim 1, wherein:
K=3;
for k=2 and k=3, the pre-determined tolerance $\chi^2$ is:

$$\chi^2 = 10^4 \left[\sum_{k=2}^{K}\sum_{r=r_{1,k}}^{r=r_{2,k}} w_k(\tau(r)_{meas} - \tau(r)_{ref,k})^2\right] / \left[\sum_{k=2}^{K}\sum_{r=r_{1,k}}^{r=r_{2,k}} w_k\right]$$

$\tau(r)_{meas}$ is measured delay at position r;
$\tau(r)_{ref,k}$ is reference delay at position r in interval k:

$$\tau(r)_{ref,k} = c_{0,k} + c_{1,k}\left(\frac{r}{a}\right)^2 + c_{2,k}\left(\frac{r}{a}\right)^4$$

r is radial position in microns;
K=3;
$w_k$ is a weighting for each of the k regions (k=2 . . . K), where $w_2$=$w_3$=1;
a is 25 microns;
$r_{1,2}$=7 microns;
$r_{2,2}$=15 microns;
$r_{1,3}$=15 microns;
$r_{2,3}$=25+ microns;

for k=2:
  $c_{0,2}$=−0.02 to 0.02 ns/km;
  $c_{1,2}$=−0.2 to 0.01 ns/km;
  $c_{2,2}$=−0.6 to 0.01 ns/km;
for k=3;
  $c_{0,3}$=0.01 to 0.1 ns/km;
  $c_{1,3}$=−0.35 to −0.1 ns/km;
  $c_{2,3}$=0.05 to 0.25 ns/km.

9. The method of claim 8, wherein:
for k=2:
  $c_{0,2}$=0.0009 ns/km;
  $c_{1,2}$=0.0011 ns/km;
  $c_{2,2}$=−0.206 ns/km;
for k=3;
  $c_{0,3}$=0.0391 ns/km;
  $c_{1,3}$=−0.233 ns/km;
  $c_{2,3}$=0.146 ns/km.

10. The method of claim 6, wherein the second set of criteria requires that $\chi^2 < 3$ (ns/km)$^2$.

11. The method of claim 10, wherein the second set of criteria requires that $\chi^2 < 2.5$ (ns/km)$^2$.

12. The method of claim 11, wherein the second set of criteria requires that $\chi^2 < 2$ (ns/km)$^2$.

13. The method of claim 1, further comprising:
selecting the multimode fiber based on meeting requirements of the first minimum bandwidth at the first wavelength based on a first set of criteria comprising:
  a first criterion using as input the measured differential mode delay (DMD) data for the multimode fiber measured at the first wavelength.

14. The method of claim 13, further comprising calculating an effective minimum bandwidth at the first wavelength (minEMBc$_1$) from the DMD data measured at the first wavelength, and wherein the first criterion requires that minEMBc$_1$ is greater than or equal to a first threshold value.

15. The method of claim 13, further comprising applying a first mask to the DMD data measured at the first wavelength, and wherein the first criterion requires that the DMD data measured at the first wavelength passes the first mask.

16. The method of claim 1, wherein the first wavelength is less than the second wavelength.

17. The method of claim 1, wherein the first wavelength is in the range 847 nm-853 nm.

18. The method of claim 14, wherein the first wavelength is in the range 847 nm-853 nm and the first threshold value is 4160 MHz-km.

19. The method of claim 13, further comprising calculating from the DMD data measured at the first wavelength an overfilled launch bandwidth at the first wavelength (OFLc$_1$), and wherein the first set of criteria further comprise a criterion requiring that OFLc$_1$ is greater than or equal to 3500 MHz-km.

20. The method of claim 1, further comprising:
measuring differential mode delay (DMD) data for the multimode fiber at the second wavelength, wherein the DMD data comprises output laser pulse data as a function of the radial position of an input laser pulse having the second wavelength
selecting the multimode fiber based on meeting requirements of the second minimum bandwidth at the second wavelength based on a third set of criteria in addition to the second set of criteria, the third set of criteria comprising:
  a third criterion using as input the measured differential mode delay (DMD) data for the multimode fiber measured at the second wavelength.

21. A method of selecting, from a plurality of multimode fibers, a third subset of the multimode fibers meeting requirements of a first minimum bandwidth at a first wavelength and a second minimum bandwidth at a second wavelength greater than the first wavelength, the method comprising:
measuring differential mode delay (DMD) data for the plurality of multimode fibers at the first wavelength, wherein the DMD data comprises output laser pulse data as a function of the radial position of an input laser pulse having the first wavelength;
selecting a first subset of the plurality of multimode fibers based on criteria comprising:
  passing a first mask applied directly to the DMD data measured at the first wavelength;
selecting a second subset of the plurality of multimode fibers based on criteria comprising:
the radial dependence of the differential mode delay data measured at the first wavelength being within a pre-determined tolerance of a pre-determined reference function constructed by concatenating two or more even-order polynomials having the form:

$$\tau(r)_{ref,k} = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \le r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={2 . . . K} where K is 2 or 3;
selecting the third subset of the plurality of multimode fibers by applying further selection criteria;
wherein:
the first subset is a subset of the plurality of multimode fibers;
the second subset is a subset of the first subset;
the third subset is a subset of the second subset.

22. A system for selecting a multimode fiber meeting requirements of a first minimum bandwidth at a first wavelength and a second minimum bandwidth at a second wavelength greater than the first wavelength, the system comprising:
a measurement device configured to measure differential mode delay (DMD) data for the multimode fiber at the first wavelength, wherein the DMD data comprises output laser pulse data as a function of the radial position of an input laser pulse having the first wavelength;
a first selection device configured to select the multimode fiber if the multimode fiber passes a first mask applied to the DMD data for the multimode fiber at the first wavelength; and
a second selection device configured to select the multimode fiber if the multimode fiber passes a selection criteria comprising:
the radial dependence of the differential mode delay data measured at the first wavelength being within a pre-determined tolerance of a pre-determined reference function constructed by concatenating two or more even-order polynomials having the form:

$$\tau(r)_{ref,k} = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \leq r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={2 ... K} where K is 2 or 3.

23. A method of selecting a multimode fiber meeting requirements of a first minimum bandwidth at a first wavelength and a second minimum bandwidth at a second wavelength different from the first wavelength, the method comprising:
selecting the multimode fiber based on meeting requirements of the first minimum bandwidth at the first wavelength based on a first set of criteria comprising:
a first criterion using as input differential mode delay (DMD) data for the multimode fiber measured at the first wavelength; and
selecting the multimode fiber based on meeting requirements of the second minimum bandwidth at the second wavelength based on a second set of criteria, comprising:
the radial or mode group number dependence of the differential mode delay data measured at the first wavelength being within a pre-determined tolerance of a pre-determined reference function constructed by concatenating two or more even-order polynomials having the form:

$$\tau(r)_{ref,k} = c_{0,k} + c_{1,k}\left(\frac{r}{a}\right)^2 + c_{2,k}\left(\frac{r}{a}\right)^4$$

wherein:
a is a normalizing factor;
r is variable radial position on the fiber over at least two different ranges $r_{1,k} \leq r < r_{2,k}$;
$c_{0,k}$, $c_{1,k}$, and $c_{2,k}$ are coefficients that are constant within each range of r;
$r_{1,k}$ and $r_{2,k}$ are discrete radial positions on the fiber marking the boundary of each range of r;
k is an indexing variable with values k={2 ... K} where K is 2 or 3.

24. A method for selecting fibers meeting requirements of a second minimum bandwidth at a second wavelength based on differential mode delay data measured at a first wavelength different from the second wavelength, the method comprising:
measuring the differential mode delay (DMD) data for the multimode fiber at the first wavelength, wherein the DMD data comprises output laser pulse data as a function of the radial position of an input laser pulse having the first wavelength;
selecting the multimode fiber based on meeting requirements of the second minimum bandwidth at the second wavelength based on a second set of criteria, comprising a second criterion comprising:
the radial dependence of the differential mode delay data measured at the first wavelength being within a pre-determined tolerance of a pre-determined reference function having the form:

$$\tau(r)_k = c_{0,k} + c_{1,k}\left(\frac{r}{a}\right)^2 + c_{2,k}\left(\frac{r}{a}\right)^4 + c_{3,k}\left(\frac{r}{a}\right)^6$$

wherein:
a is a normalizing factor;
r is variable radial position on the fiber over at least one range $r_{1,k} \leq r < r_{2,k}$;
$c_{0,k}$, $c_{1,k}$, $c_{2,k}$, and $c_{3,k}$ are coefficients that are constant within each range of r;
$r_{1,k}$ and $r_{2,k}$ are discrete radial positions on the fiber marking the boundary of each range of r;
k is an indexing variable with values k={1 ... K} where K is 1 or 2.

25. The method of claim 1, wherein the second wavelength is in the range 950 nm-1070 nm.

* * * * *

UNITED STATES PATENT AND TRADEMARK OFFICE
CERTIFICATE OF CORRECTION

PATENT NO. : 10,921,513 B2
APPLICATION NO. : 16/682283
DATED : February 16, 2021
INVENTOR(S) : John Steele Abbott, III et al.

It is certified that error appears in the above-identified patent and that said Letters Patent is hereby corrected as shown below:

On the Title Page

On page 2, in Column 1, item (56), Other Publications, Line 3, delete "(1978." and insert -- 1978. --, therefor.

On page 2, in Column 1, item (56), Other Publications, Line 5, delete "(1986." and insert -- 1986. --, therefor.

In the Claims

In Column 33, Line 15, Claim 1, delete "$(r)_k$" and insert -- $(r)_{ref,k}$ --, therefor.

In Column 34, Line 12, Claim 6, delete "$(r)_{ref,\ k}$" and insert -- $(r)_{ref,k}$ --, therefor.

In Column 34, Line 54, Claim 8, delete "$(r)_{ref,\ k}$" and insert -- $(r)_{ref,k}$ --, therefor.

In Column 38, Line 29 (approx.), Claim 24, delete "$(r)_k$" and insert -- $(r)_{ref,k}$ --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*